(12) United States Patent
Hinatsu

(10) Patent No.: US 12,511,359 B2
(45) Date of Patent: Dec. 30, 2025

(54) AUTHENTICATION DEVICE, AUTHENTICATION METHOD, AND COMPUTER READABLE MEDIUM USING BIOLOGICAL SIGNALS TO AUTHENTICATE

(71) Applicant: Mitsubishi Electric Corporation, Tokyo (JP)

(72) Inventor: Shun Hinatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 343 days.

(21) Appl. No.: 18/139,729

(22) Filed: Apr. 26, 2023

(65) Prior Publication Data

US 2023/0259599 A1 Aug. 17, 2023

Related U.S. Application Data

(63) Continuation of application No. PCT/JP2020/048990, filed on Dec. 25, 2020.

(51) Int. Cl.
*G06F 21/00* (2013.01)
*G06F 21/32* (2013.01)

(52) U.S. Cl.
CPC .................................. *G06F 21/32* (2013.01)

(58) Field of Classification Search
CPC .................................. G06F 21/32; G06T 7/00
See application file for complete search history.

(56) References Cited

U.S. PATENT DOCUMENTS

| 10,575,176 | B2* | 2/2020 | Takahashi | ............. H04L 63/083 |
| 2014/0205165 | A1 | 7/2014 | Jeanne et al. | |
| 2016/0267314 | A1* | 9/2016 | Ohtsuka | ................. G06V 40/13 |
| 2016/0358011 | A1 | 12/2016 | Watanabe | |

(Continued)

FOREIGN PATENT DOCUMENTS

| CN | 106445101 A | 2/2017 |
| CN | 111433781 A | 7/2020 |

(Continued)

OTHER PUBLICATIONS

German Office Action for the German Application No. 11 2020 007 726.8, dated Mar. 21, 2024, with an English translation.

(Continued)

*Primary Examiner* — William A Corum, Jr.
(74) *Attorney, Agent, or Firm* — Birch, Stewart, Kolasch & Birch, LLP

(57) ABSTRACT

A signal acquisition unit (21) acquires a biological signal. An authentication information generation unit (22) generates, based on the biological signal acquired by the signal acquisition unit (21), authentication information that differs depending on the individual of a biological body. A part information generation unit (23) generates, based on the biological signal acquired by the signal acquisition unit (21), part information that differs depending on the part from which the biological signal is acquired even in a single individual. An authentication unit (24) performs authentication based on the authentication information generated by the authentication information generation unit (22) and the part information generated by the part information generation unit (23).

21 Claims, 20 Drawing Sheets

(56) References Cited

U.S. PATENT DOCUMENTS

| | | | |
|---|---|---|---|
| 2016/0358332 A1 | 12/2016 | Watanabe | |
| 2017/0035327 A1 | 2/2017 | Yuen et al. | |
| 2017/0035328 A1 | 2/2017 | Yuen et al. | |
| 2017/0038848 A1* | 2/2017 | Yuen | G06F 3/017 |
| 2017/0039358 A1 | 2/2017 | Yuen et al. | |
| 2017/0235932 A1* | 8/2017 | Yagi | G06F 21/32 726/18 |
| 2017/0255273 A1 | 9/2017 | Yuen et al. | |
| 2017/0337414 A1 | 11/2017 | Ohno et al. | |
| 2018/0000359 A1 | 1/2018 | Watanabe | |
| 2018/0042486 A1 | 2/2018 | Yoshizawa et al. | |
| 2018/0067565 A1 | 3/2018 | Yuen et al. | |
| 2018/0153422 A1 | 6/2018 | Watanabe | |
| 2018/0322328 A1* | 11/2018 | Pang | A61B 5/024 |
| 2019/0050064 A1 | 2/2019 | Yuen et al. | |
| 2019/0069781 A1 | 3/2019 | Kim et al. | |
| 2019/0236253 A1* | 8/2019 | Wang | H04M 1/02 |
| 2019/0332757 A1* | 10/2019 | Chen | G06V 40/45 |
| 2020/0064921 A1 | 2/2020 | Kang et al. | |
| 2020/0167004 A1 | 5/2020 | Yuen et al. | |
| 2020/0237238 A1 | 7/2020 | Watanabe | |
| 2020/0410191 A1 | 12/2020 | Skovgaard Christensen et al. | |
| 2021/0030291 A1 | 2/2021 | Watanabe | |
| 2021/0169353 A1 | 6/2021 | Watanabe | |
| 2021/0264598 A1 | 8/2021 | Watanabe | |
| 2022/0395186 A1 | 12/2022 | Yoshizawa et al. | |

FOREIGN PATENT DOCUMENTS

| | | |
|---|---|---|
| JP | 2008-73462 A | 4/2008 |
| JP | 2009-64455 A | 3/2009 |
| JP | 2011-81792 A | 4/2011 |
| JP | 2013-257906 A | 12/2013 |
| JP | 2014-529797 A | 11/2014 |
| JP | 2014-239737 A | 12/2014 |
| JP | 2017-742 A | 1/2017 |
| JP | 2017-743 A | 1/2017 |
| JP | 2017-224356 A | 12/2017 |
| JP | 2018-8039 A | 1/2018 |
| JP | 2018-89369 A | 6/2018 |
| JP | 2019-42500 A | 3/2019 |
| JP | 2019-208133 A | 12/2019 |
| JP | 2020-62529 A | 4/2020 |
| JP | 2020-93114 A | 6/2020 |
| WO | WO 2009/016846 A1 | 2/2009 |
| WO | WO 2016/067556 A1 | 5/2016 |

OTHER PUBLICATIONS

Karimian et al., "ECG Biometric: Spoofing and Countermeasures", Transactions on Biometrics, Behavior, and Identity Science, IEEE, vol. 2, No. 3, Jul. 2020, pp. 257-270.

Mousavi et al., "Fusion of ECG and PPG Signals in Apply to Spoof Detection and Biometric Authentication", Master's Thesis, Graduate Department of the Edward S. Rogers Sr. Department of Electrical and Computer Engineering, University of Toronto (Canada), Nov. 2020, pp. 1-107.

Eberz et al., "Broken Hearted: How to Attack ECG Biometrics", Network and Distributed System Security Symposium, 2017, pp. 1-15.

Hartmann et al., "Quantitative Comparison of Photoplethysmographic Waveform Characteristics: Effect of Measurement Site", Frontiers in Physiology, Mar. 2019, vol. 10, pp. 198-205.

International Search Report for PCT/JP2020/048990 mailed on Mar. 23, 2021.

Japanese Notice of Reasons for Refusal, issued in JP Application No. 2021-526815 dated Sep. 7, 2021.

Nowara et al., "PPGSecure: Biometric Presentation Attack Detection Using Photopletysmograms", 12th IEEE International Conference on Automatic Face & Gesture Recognition, 2017, pp. 56-62.

Chinese Office Action and Search Report for Chinese Application No. 202080108030.8, dated Feb. 24, 2025, with English translation.

Chinese Office Action for Chinese Application No. 202080108030.8, dated Sep. 9, 2025, with English translation.

* cited by examiner

Fig. 3

| USER NAME OR ID | MEASUREMENT DATE AND TIME | FEATURE VALUE 1 (AUTHENTICATION INFORMATION) | ... | FEATURE VALUE 2 (PART INFORMATION) | ... |
|---|---|---|---|---|---|
| A | 2018/11/6 08:11:13 | 3.79 | ... | 25 | ... |
| A | 2019/11/6 20:11:28 | 3.84 | ... | 28 | ... |
| B | 2019/10/6 15:14:24 | 2.86 | ... | 31 | ... |
| B | 2020/11/4 12:36:40 | 3.00 | ... | 18 | ... |
| ... | ... | ... | | ... | |

Fig. 13

| USER NAME OR ID | MEASUREMENT DATE AND TIME | SENSOR CONTROL INFORMATION | FEATURE VALUE 1 (AUTHENTICATION INFORMATION) | ... | FEATURE VALUE 2 (PART INFORMATION) | ... |
|---|---|---|---|---|---|---|
| A | 2018/11/6 08:11:13 | USE OF SENSOR 1 | 3.79 | ... | 25 | ... |
| A | 2019/11/6 20:11:28 | USE OF SENSOR 2 | 3.84 | ... | 28 | ... |
| B | 2019/10/6 15:14:24 | USE OF SENSOR 1 | 2.86 | ... | 31 | ... |
| B | 2020/11/4 12:36:40 | USE OF SENSOR 2 | 3.00 | ... | 18 | ... |
| ... | | | ... | | ... | |

Fig. 14

| USER NAME OR ID | MEASUREMENT DATE AND TIME | SENSOR CONTROL INFORMATION | FEATURE VALUE 1 (AUTHENTICATION INFORMATION) | ... | FEATURE VALUE 2 (PART INFORMATION) | ... |
|---|---|---|---|---|---|---|
| A | 2018/11/6 08:11:13 | USE OF GREEN LIGHT SOURCE | 3.79 | ... | 25 | ... |
| A | 2019/11/6 20:11:28 | USE OF INFRARED LIGHT SOURCE | 3.84 | ... | 28 | ... |
| B | 2019/10/6 15:14:24 | USE OF GREEN LIGHT SOURCE | 2.86 | ... | 31 | ... |
| B | 2020/11/4 12:36:40 | USE OF INFRARED LIGHT SOURCE | 3.00 | ... | 18 | ... |
| ... | | | | ... | ... | |

Fig. 19

| USER NAME OR ID | MEASUREMENT DATE AND TIME | FEATURE VALUE 1 (AUTHENTICATION INFORMATION) | ... | FEATURE VALUE 2 (PART INFORMATION) | ... | PHYSIOLOGICAL INDEX | ... |
|---|---|---|---|---|---|---|---|
| A | 2018/11/6 08:11:13 | 3.79 | ... | 25 | ... | 70 | ... |
| A | 2019/11/6 20:11:28 | 3.84 | ... | 28 | ... | 69 | ... |
| B | 2019/10/6 15:14:24 | 2.86 | ... | 31 | ... | 97 | ... |
| B | 2020/11/4 12:36:40 | 3.00 | ... | 18 | ... | 94 | ... |
| ... | ... | ... | ... | ... | ... | ... | ... |

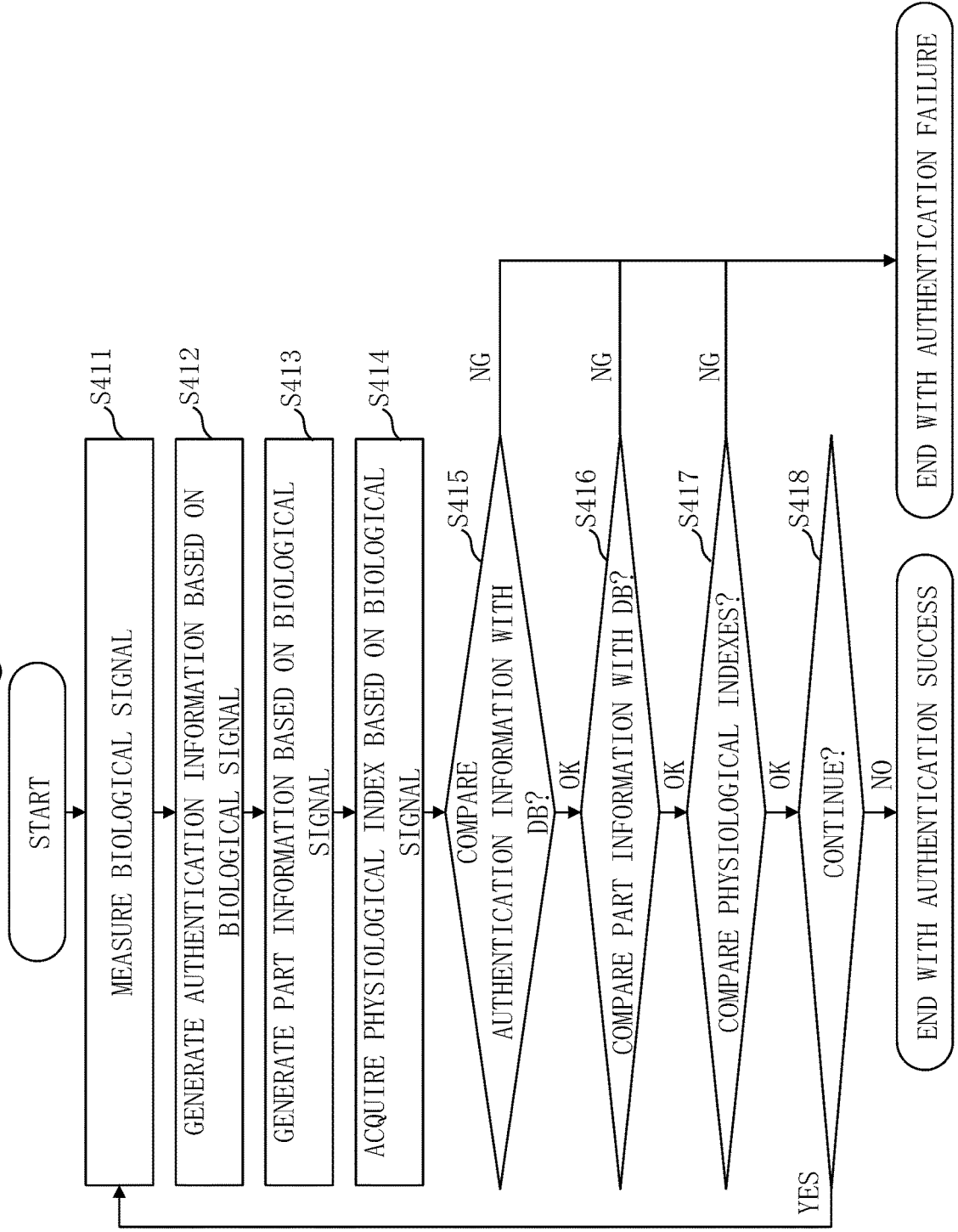

AUTHENTICATION DEVICE, AUTHENTICATION METHOD, AND COMPUTER READABLE MEDIUM USING BIOLOGICAL SIGNALS TO AUTHENTICATE

CROSS REFERENCE TO RELATED APPLICATION

This application is a Continuation of PCT International Application No. PCT/JP2020/048990, filed on Dec. 25, 2020, which is hereby expressly incorporated by reference into the present application.

TECHNICAL FIELD

The present disclosure relates to an authentication technology that uses a biological signal.

BACKGROUND ART

Development of IoT (Internet of Things) diversifies scenes and devices for authenticating the subject. The biometric authentication with physical features that can be measured by images, which is represented by face authentication or fingerprint authentication, puts less burdens on the subject than password authentication or the like. Accordingly, biometric authentication is in widespread use as devices such as smartphones and smartwatches increase.

In recent years, attempts are being made to use, as physical features, an Electrocardiogram (referred to below as an ECG), which is a biological signal acquired by measuring the electrical activity of the heart, for authentication. In some countries, ECG-based authentication devices are being put to practical use. In addition, research is also being conducted on the use of a Photoplethysmogram (referred to below as a PPG), which is a biological signal acquired by optically measuring the behavior of blood vessels caused by heartbeats, for authentication. Here, an ECG and a PPG are time series signals.

As described in Non-Patent Literatures 1 and 2, biological signals such as an ECG and a PPG may be measured in various parts of a body. By using this, an attacker who wants to impersonate a subject may install a sensor at a position in contact with the body of the subject to measure a biological signal fraudulently. Alternatively, since a biological signal is often treated as an electrical signal, an attack in which the attacker generates a biological signal fraudulently and inputs the signal into the authentication device is conceivable, as described in Non-Patent Literature 1.

Accordingly, as authentication with a biological signal spreads and diversifies in the future, it is necessary to achieve an authentication method having countermeasures against spoofing attacks that measure biological signals fraudulently and generate biological signals fraudulently.

Patent Literature 1 and Non-Patent Literature 3 describe authentication having countermeasures against spoofing attacks that use information generated fraudulently by the attacker.

Patent Literature 1 describes a technique that performs authentication by ensuring that a presented fingerprint has not been artificially generated but been acquired from a biological body (finger) by confirming that a PPG can be measured from a finger before performing fingerprint authentication.

Non-Patent Literature 3 describes a technique that performs authentication by confirming that a PPG can be measured by a camera and image processing together with face authentication and ensuring that the subject measured by a camera for face authentication is not an artificial object such as a mask but a biological body (face).

CITATION LIST

Patent Literature

Patent Literature 1: JP 2020-093114

Non-Patent Literature

Non-Patent Literature 1: S. Eberz et al. "Broken hearted: How to attack ECG biometrics". Network and Distributed System Security Symposium, pp. 1-15, 2017.

Non-Patent Literature 2: V. Hartmann et al. "Quantitative comparison of photoplethysmographic waveform characteristics: effect of measurement site". Frontiers in physiology, Vol. 10, pp. 198-205, 2019.

Non-Patent Literature 3: E. M. Nowara et al. "Ppgsecure: Biometric presentation attack detection using photopletysmograms". 12th IEEE International Conference on Automatic Face & Gesture Recognition, pp. 56-62, 2017.

SUMMARY OF INVENTION

Technical Problem

The countermeasures against spoofing attacks described in Patent Literature 1 and Non-Patent Literature 3 are countermeasures to be added to the authentication by physical features acquired as images, such as a fingerprint or a face. Accordingly, the countermeasures against spoofing attacks to authentication with a biological signal are insufficient. In particular, no countermeasures in terms of authentication are taken against spoofing attacks that use the fraudulent measurement of a biological signal of the person to be impersonated.

An object of the present disclosure is to make it possible to achieve countermeasures against spoofing attacks that use the fraudulent measurement of a biological signal.

Solution to Problem

Advantageous Effects of Invention

The present disclosure performs authentication by using the part information in addition to the authentication information. This can perform control so that authentication does not succeed when the biological signal having been fraudulently measured in an unintended part is used. Accordingly, the countermeasures against spoofing attacks that use fraudulent measurement of the biological signal can be achieved.

BRIEF DESCRIPTION OF DRAWINGS

FIG. 3 is an explanatory diagram of part information when a biological signal according to Embodiment 1 is an ECG.

FIG. 13 is an explanatory diagram of authentication reference information and part reference information according to Embodiment 3.

FIG. 14 is an explanatory diagram of authentication reference information and part reference information according to Embodiment 3.

FIG. 19 is an explanatory diagram of authentication reference information, part reference information, and the reference values of physiological indexes according to Embodiment 4.

FIG. 20 is a flowchart of processing of the authentication device 10 according to Modification 7.

DESCRIPTION OF EMBODIMENTS

Embodiment 1

Description of the Structure

Figure 1:
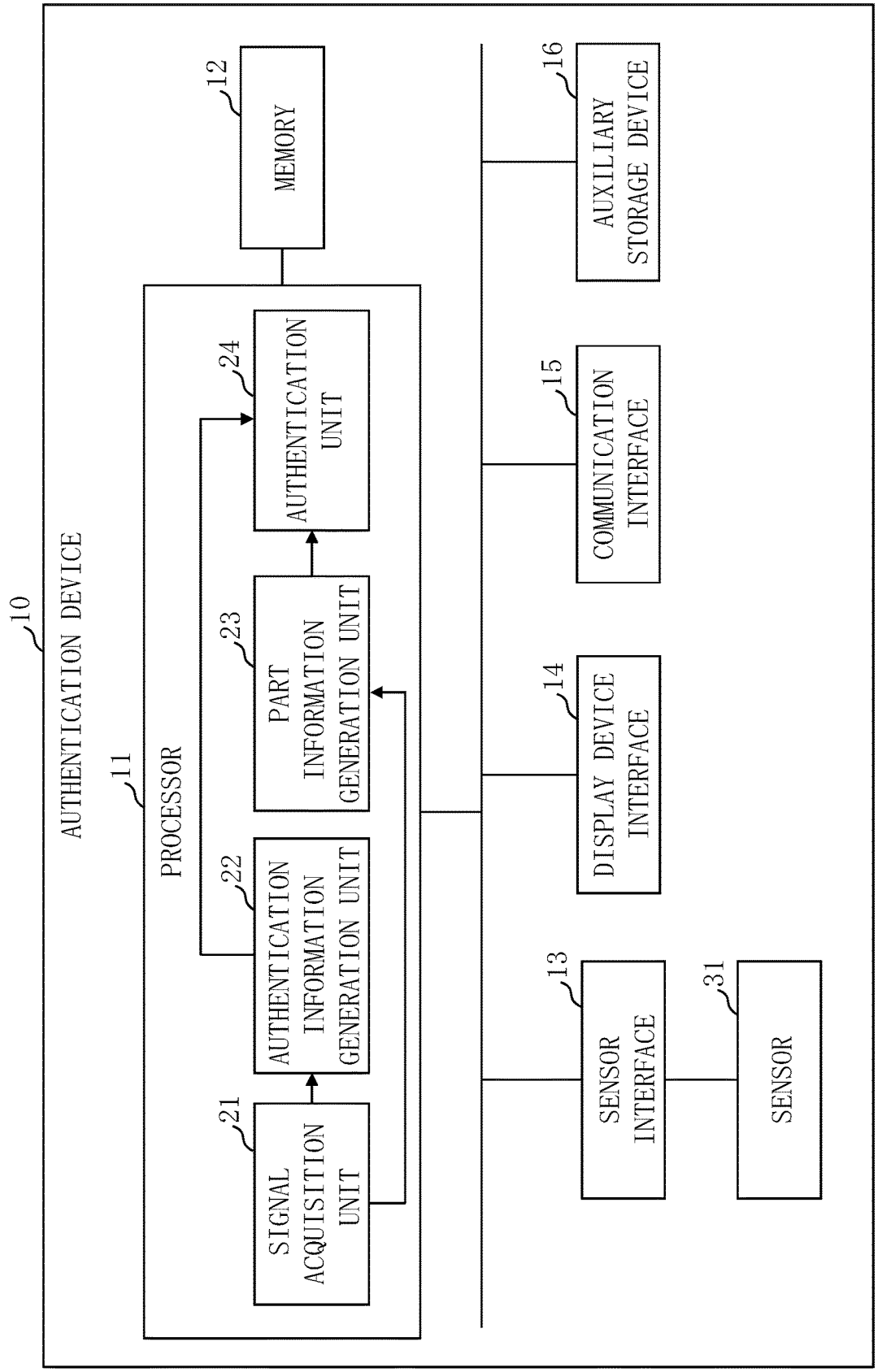
FIG. 1 is a structural diagram of an authentication device 10 according to Embodiment 1.

The structure of an authentication device 10 according to Embodiment 1 will be described with reference to FIG. 1.

The authentication device 10 is a computer. Specific examples of the authentication device 10 are a wearable device such as a smartwatch, a mobile device such as a smartphone, and a stationary device installed at the entrance of a building or the like.

The authentication device 10 includes a processor 11, a memory 12, a sensor interface 13, a display device interface 14, a communication interface 15, and an auxiliary storage device 16, as hardware. The processor 11 is connected to other pieces of hardware via signal lines and controls the other pieces of hardware.

The processor 11 is an IC (Integrated Circuit) that performs processing. Specific examples of the processor 11 are a CPU (Central Processing Unit), a DSP (Digital Signal Processor), and a GPU (Graphics Processing Unit).

The memory 12 is a storage device that temporarily stores data. Specific examples of the memory 12 are a SRAM (Static Random Access Memory) and a DRAM (Dynamic Random Access Memory).

The sensor interface 13 is an interface for communicating with a sensor 31, which is installed in the authentication device 10 or installed outside the authentication device 10. A specific example of the sensor interface 13 is a USB (Universal Serial Bus) port.

The sensor 31 is installed in the authentication device 10 in FIG. 1, but the sensor 31 may be installed outside the authentication device 10. For example, the sensor 31 may be worn by a subject separately from the authentication device 10. The sensor interface 13 may also be provided separately from the authentication device 10, as in the sensor 31. In this case, the authentication device 10 is connected to the sensor interface 13 via the communication interface 15.

The display device interface 14 is an interface for communicating with a display device, which is installed in the authentication device 10 or installed outside the authentication device 10. A specific example of the display device interface 14 is an HDMI (registered trademark, High-Definition Multimedia Interface) port.

The communication interface 15 is an interface for communicating with an external device. A specific example of the communication interface 15 is an Ethernet (registered trademark) port.

The auxiliary storage device 16 is a storage device that stores data. A specific example of the auxiliary storage device 16 is an HDD (Hard Disk Drive). Alternatively, the auxiliary storage device 16 may be a portable recording medium such as an SD (registered trademark, Secure Digital) memory card, a CF (CompactFlash, registered trademark), a NAND flash, a flexible disc, an optical disc, a compact disc, a Blu-ray (registered trademark) disc, or a DVD (Digital Versatile Disk).

The authentication device 10 includes a signal acquisition unit 21, an authentication information generation unit 22, a part information generation unit 23, and an authentication unit 24 as functional components. The functions of the functional components of the authentication device 10 are implemented by software.

The auxiliary storage device 16 stores programs that achieve the functions of the individual functional components of the authentication device 10. These programs are read to the memory 12 by the processor 11 and executed by the processor 11. This achieves the functions of the individual functional components of the authentication device 10.

FIG. 1 illustrates only one processor 11. However, a plurality of processors 11 may be provided, and the plurality of processors 11 may execute the programs that achieve the individual functions in cooperation.

Description of the Operation

The operation of the authentication device 10 according to Embodiment 1 will be described with reference to FIGS. 2 to 5.

The operation procedure of the authentication device 10 according to Embodiment 1 corresponds to the authentication method according to Embodiment 1. In addition, the programs that achieve the operation of the authentication device 10 according to Embodiment 1 correspond to the authentication programs according to Embodiment 1.

A flow of processing of the authentication device 10 according to Embodiment 1 will be described with reference to FIG. 2.

(Step S101: Signal Acquisition Processing)

The signal acquisition unit 21 acquires the biological signal of the subject from the sensor 31 connected via the sensor interface 13. An example of the biological signal may be a time-series signal such as an ECG acquired by measuring the electrical activity of the heart or a PPG acquired by optically measuring the behavior of a blood vessel accompanying heartbeats. However, the biological signal is not limited to these signals. The signal acquisition unit 21 writes the biological signal to the memory 12.

(Step S102: Authentication Information Generation Processing)

The authentication information generation unit 22 generates, based on the biological signal acquired in step S101, the authentication information that differs depending on the individual of the biological body.

Specifically, the authentication information generation unit 22 reads the biological signal from the memory 12. The authentication information generation unit 22 generates the authentication information by using a method that generates the waveform of the biological signal as the authentication information or a method that extracts the feature value from the biological signal and uses the feature value as the authentication information. The generation method of the authentication information is not limited as long as the authentication information differs depending on the individual of the biological body. The authentication information generation unit 22 writes the authentication information to the memory 12.

(Step S103: Part Information Generation Processing)

The part information generation unit 23 generates, based on the biological signal acquired in step S101, the part information that differs depending on the part from which the biological signal is acquired even in a single individual.

Specifically, the part information generation unit 23 reads the biological signal from the memory 12. Like the generation method of the authentication information, the part information generation unit 23 generates the part information by using a method that generates the waveform of the biological signal as the part information or a method that extracts the feature value from the biological signal and uses the feature value as the part information. However, the part information need be information that differs depending on the part from which the biological signal is acquired. The generation method of the part information is not limited as long as the part information differs depending on the part from which the biological signal is acquired. The part information generation unit 23 writes the part information to the memory 12.

An example of the part information when the biological signal is an ECG will be described with reference to FIG. 3.

FIG. 3 illustrates an example in which ECG waveforms measured at a plurality of points are superimposed for comparison. Specifically, FIG. 3 illustrates the ECG waveform measured in the wrist and the ECG waveform measured in the palm for a single individual. It can be seen in FIG. 3 that, even in the single individual, there are a deviation between the local maximum values and a deviation between the times at which the local maximum values appeared. Accordingly, the local maximum values and the times at which the local maximum values appeared in the ECG waveforms may be the part information.

An example of the part information when the biological signal is a PPG will be described with reference to FIG. 4.

Figure 4:
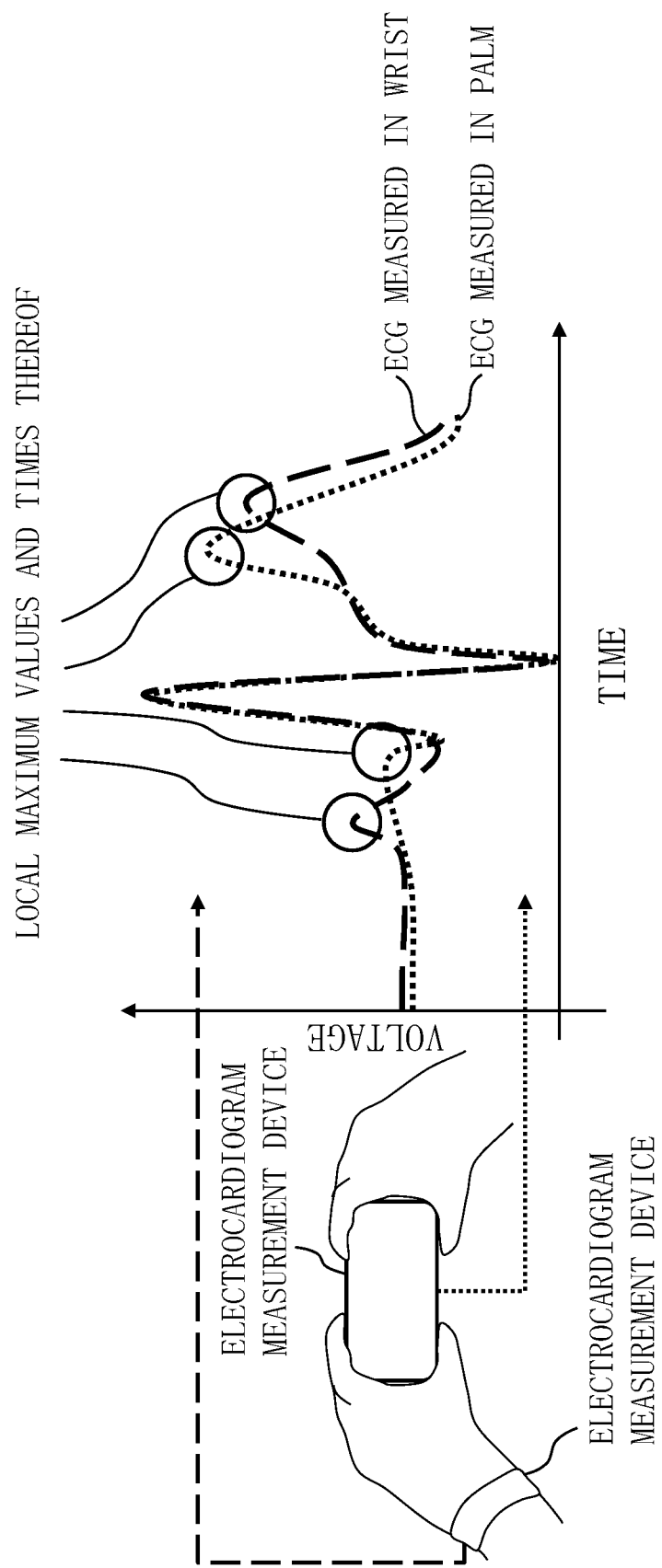
FIG. 4 is an explanatory diagram of part information when the biological signal according to Embodiment 1 is a PPG.

FIG. 4 illustrates an example in which PPG waveforms measured at a plurality of points are superimposed for comparison. Specifically, FIG. 4 illustrates the PPG waveform measured in the finger and the PPG waveform measured in the forehead for a single individual. It can be seen in FIG. 4 that, even in the single individual, there are a deviation between the times at which the first local maximum values appeared and a deviation between the second local maximum values. Accordingly, the local maximum values and the times at which the local maximum values appeared in the PPG waveforms may be the part information.

(Step S104: First Authentication Processing)

The authentication unit 24 determines whether the first authentication has succeeded or failed by comparing the authentication information generated in step S102 with the authentication reference information stored in advance in the auxiliary storage device 16.

Specifically, the authentication unit 24 determines whether the condition that the similarity between the authentication information generated in step S102 and the authentication reference information is equal to or more than a first threshold or the difference between the authentication information generated in step S102 and the authentication reference information falls within an allowable value is met. The authentication unit 24 determines that the first authentication has succeeded when the condition is met or determines that the first authentication has failed when the condition is not met.

When determining that the first authentication has succeeded, the authentication unit 24 proceeds the processing to step S105. In contrast, when determining that the first authentication has failed, the authentication unit 24 ends the processing with an authentication failure. It should be noted that, when determining that the first authentication has failed, the authentication unit 24 may return the processing to step S101 to perform the authentication processing again.

(Step S105: Second Authentication Processing)

The authentication unit 24 determines whether the second authentication has succeeded or failed by comparing the part information generated in step S103 with the part reference information stored in advance in the auxiliary storage device 16. Specifically, the authentication unit 24 determines whether the condition that the similarity between the part information generated in step S103 and the part reference information is equal to or more than a second threshold or the difference between the part information generated in step S103 and the part reference information falls within an allowable value is met. The authentication unit 24 determines that the second authentication has succeeded when the condition is met or determines that the second authentication has failed when the condition is not met.

When determining that the second authentication has succeeded, the authentication unit 24 ends the processing with an authentication success. In contrast, when determining that the second authentication has failed, the authentication unit 24 ends the processing with an authentication failure. It should be noted that, when determining that the second authentication has failed, the authentication unit 24 may return the processing to step S101 to perform the authentication processing again.

In step S104, the authentication reference information is stored in the auxiliary storage device 16 in advance. In addition, in step S105, the part reference information is stored in the auxiliary storage device 16 in advance.

Figure 2:
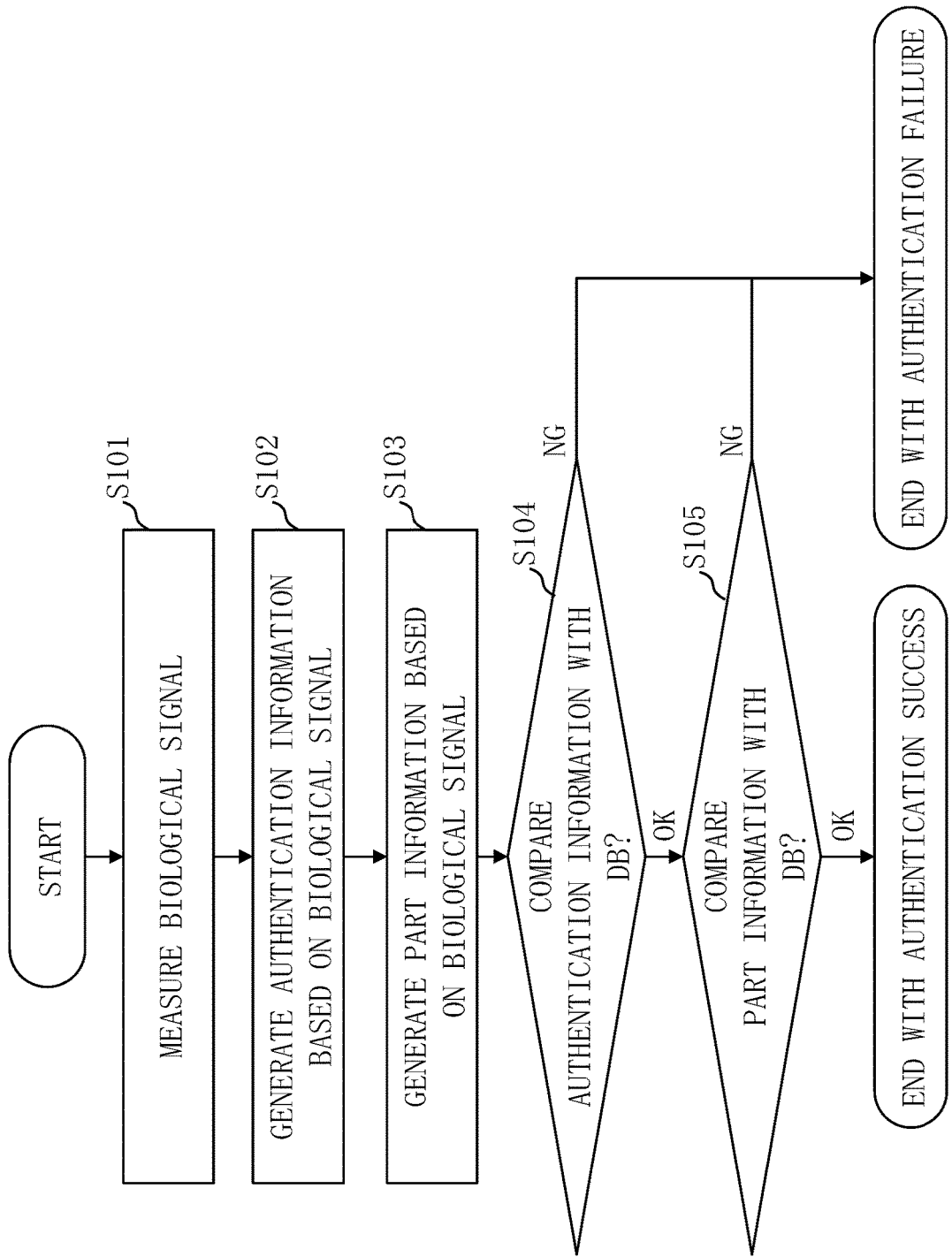
FIG. 2 is a flowchart of processing of the authentication device 10 according to Embodiment 1.

As described above, the authentication reference information and the part reference information need be stored before the processing illustrated in FIG. 2 is performed. Specifically, the processing from step S101 to step S103 is performed, the authentication information generated in step S102 is stored as the authentication reference information, and the part information generated in step S103 is stored as the part reference information.

Figure 5:
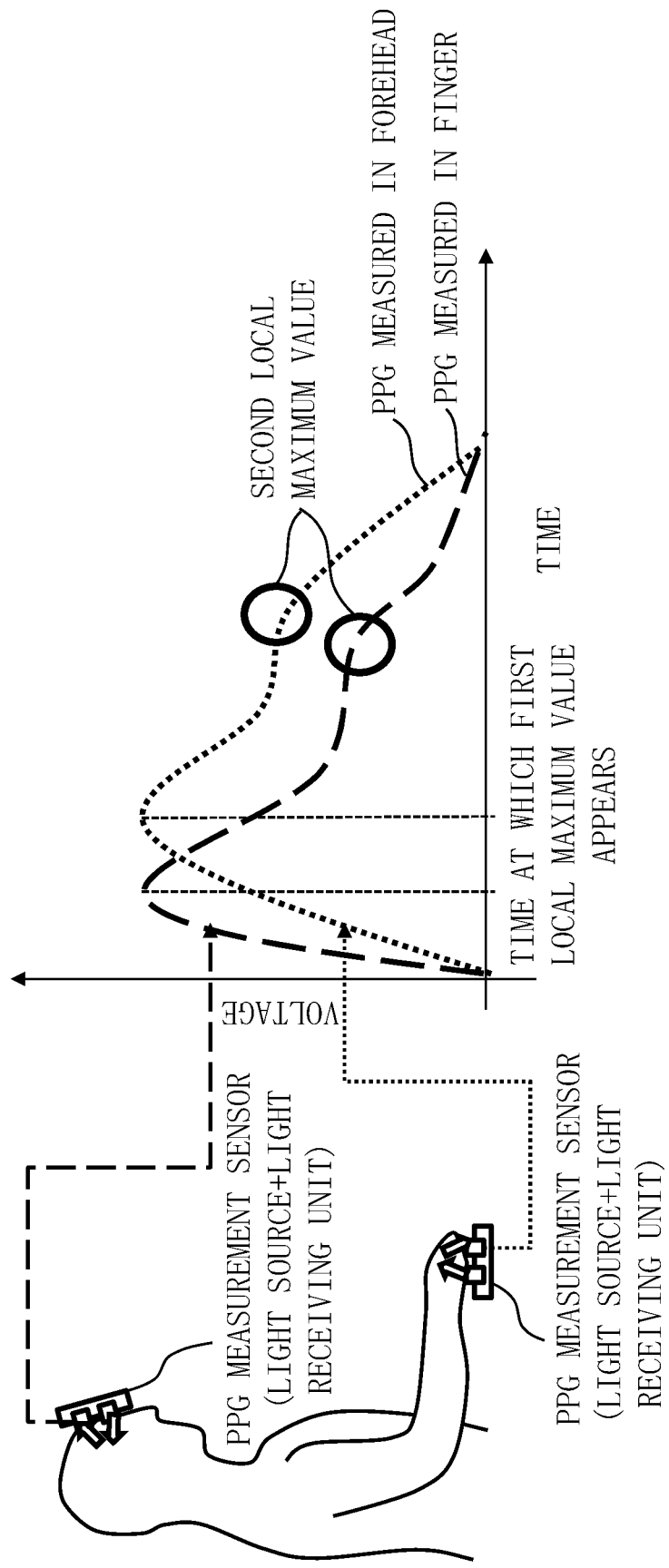
FIG. 5 is an explanatory diagram of authentication reference information and part reference information according to Embodiment 1.

The authentication information and the part information may change over the years. Therefore, the authentication reference information and the part reference information may be acquired again after a certain period of time. Then, as illustrated in FIG. 5, for one subject, the authentication reference information and the part reference information are stored together with the measurement date and time of the biological signal. It should be noted that FIG. 5 illustrates the case in which feature values are used as the authentication reference information and the part reference information.

It should be noted that the order of execution of step S102 and step S103 and the order of execution of step S104 and step S105 are not limited to those illustrated in FIG. 2 and may be changed.

Effect of Embodiment 1

As described above, the authentication device 10 according to Embodiment 1 performs authentication by using the part information in addition to the authentication information. This can perform control so that authentication does not succeed when the biological signal having been fraudulently measured in an unintended part is used. Accordingly, countermeasures against spoofing attacks that use fraudulent measurement of the biological signal can be achieved.

Other Structures

Modification 1

The number of sensors 31 is not particularly limited. The authentication information and the part information may be generated based on a single biological signal measured by a single sensor, or the authentication information and the part information may be generated based on a plurality of biological signals measured by a plurality of sensors.

Alternatively, the signal acquisition unit 21 may control the sensor 31 via the sensor interface 13 to acquire the biological signal for generating the authentication information or the biological signal for generating the part information by switching between these signals. For example, the signal acquisition unit 21 may switch the sensor 31 to be used or change the setting value required to operate the sensor 31. In this case, the authentication information generation unit 22 generates the authentication information based on the biological signal for generating the authentication information and the part information generation unit 23 generates the part information based on the biological signal for generating the part information.

Modification 2

In Embodiment 1, when the first authentication based on the authentication information and the second authentication based on the part information succeed once, an authentication success is determined. However, when the first authentication based on the authentication information and the second authentication based on the part information succeed continuously a plurality of times, an authentication success may be determined.

Figure 6:
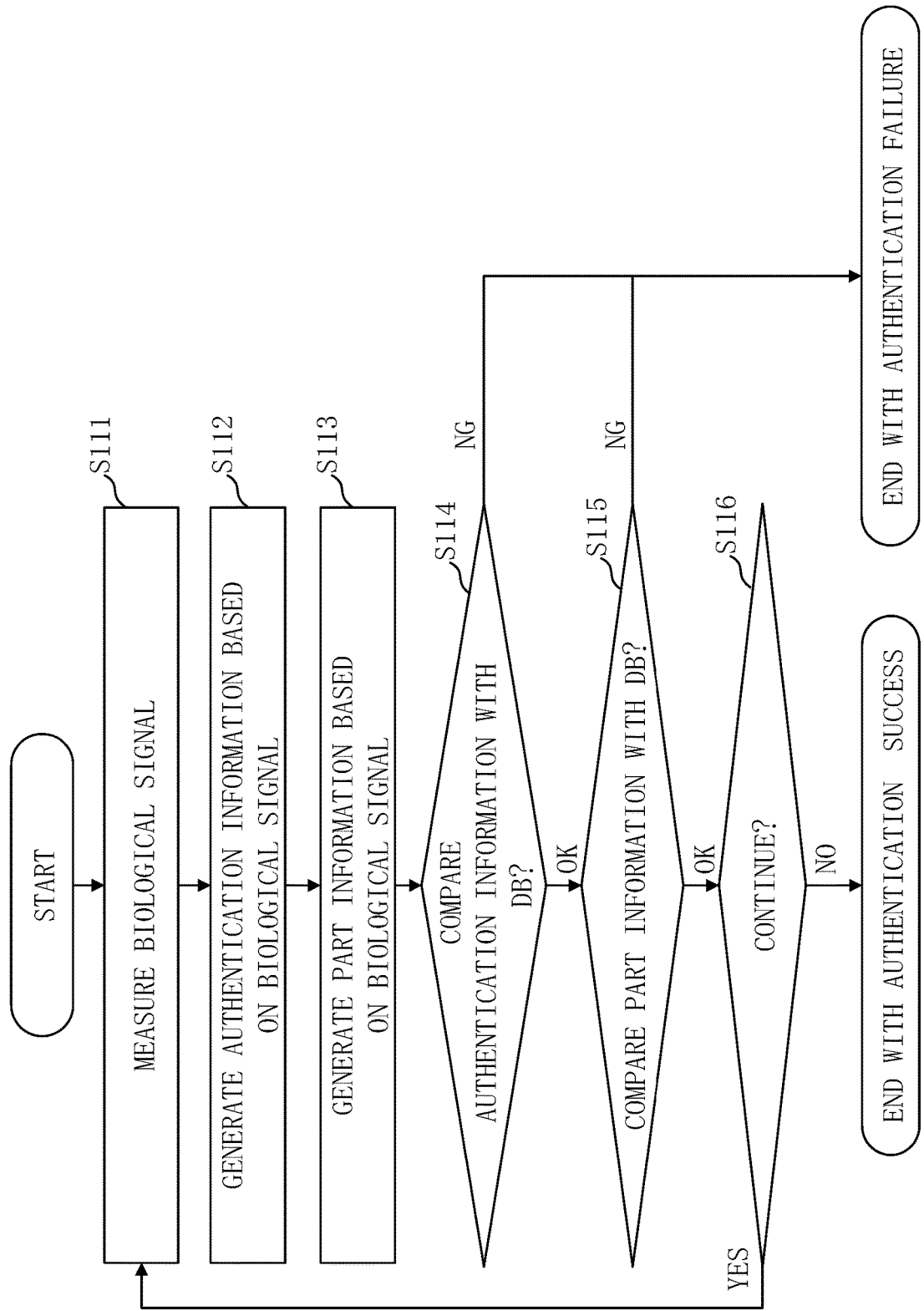
FIG. 6 is a flowchart of processing of the authentication device 10 according to Modification 2.

A flow of processing of the authentication device 10 according to Modification 2 will be described with reference to FIG. 6.

The processing from step S111 to step S115 is the same as the processing from step S101 to step S105 in FIG. 2. However, when determining that the second authentication has succeeded in step S115, the authentication unit 24 proceeds the processing to step S116.

Step S116: Continuation Determination Processing

The authentication unit 24 determines whether the number of successes of the first authentication and the second authentication has reached the reference count.

When the number of successes has reached the reference count, the authentication unit 24 ends the processing with an authentication success. In contrast, when the number of successes has not reached the reference count, the authentication unit 24 returns the processing to step S111.

It should be noted that, in step S115 in the second and subsequent rounds, the authentication unit 24 may determine whether the part information pertains to the same part as the part information generated in the first round. Then, the authentication unit 24 may determine that the second authentication has succeeded when the condition is met and the part information pertains to the same part as the part information generated in the first round.

Accordingly, when the measurement part is changed during the processing, an authentication failure may be determined. That is, when the sensor moves during the processing, an authentication failure may be determined.

Modification 3

In Embodiment 1, the individual functional components are achieved by software. However, the individual functional components may be achieved by hardware in Modification 3. The following describes the differences between Modification 3 and Embodiment 1.

The structure of the authentication device 10 according to Modification 3 will be described.

When the individual functional components are achieved by hardware, the authentication device 10 has electronic circuits instead of the processor 11, the memory 12, and the auxiliary storage device 16. The electronic circuits are dedicated circuits that achieve the functions of the individual functional components, the memory 12, and the auxiliary storage device 16.

The electronic circuits may be a single circuit, combined circuits, programmed processors, parallel-programmed processors, logic ICs, GAs (Gate Arrays), ASICs (Application Specific Integrated Circuits), and FPGAs (Field-Programmable Gate Arrays).

The individual functional components may be achieved by one electronic circuit, or the individual functional components may be achieved by a plurality of electronic circuits in a distributed manner.

Modification 4

In Modification 4, some of the functional components may be achieved by hardware and the other functional components may be achieved by software.

The processor 11, the memory 12, the auxiliary storage device 16, and the electronic circuits are referred to as processing circuits. That is, the functions of the individual functional components are achieved by processing circuits.

Embodiment 2

Embodiment 2 differs from Embodiment 1 in that calculation is performed by using, as an input, the plurality of biological signals acquired from the plurality of sensors 31 and at least one of the authentication information and the part information is generated based on a generated composite signal. In Embodiment 2, this difference will be described and identical points are not described.

In Embodiment 2, the case in which both the authentication information and the part information are generated based on the composite signal will be described.

Description of the Structure

Figure 7:
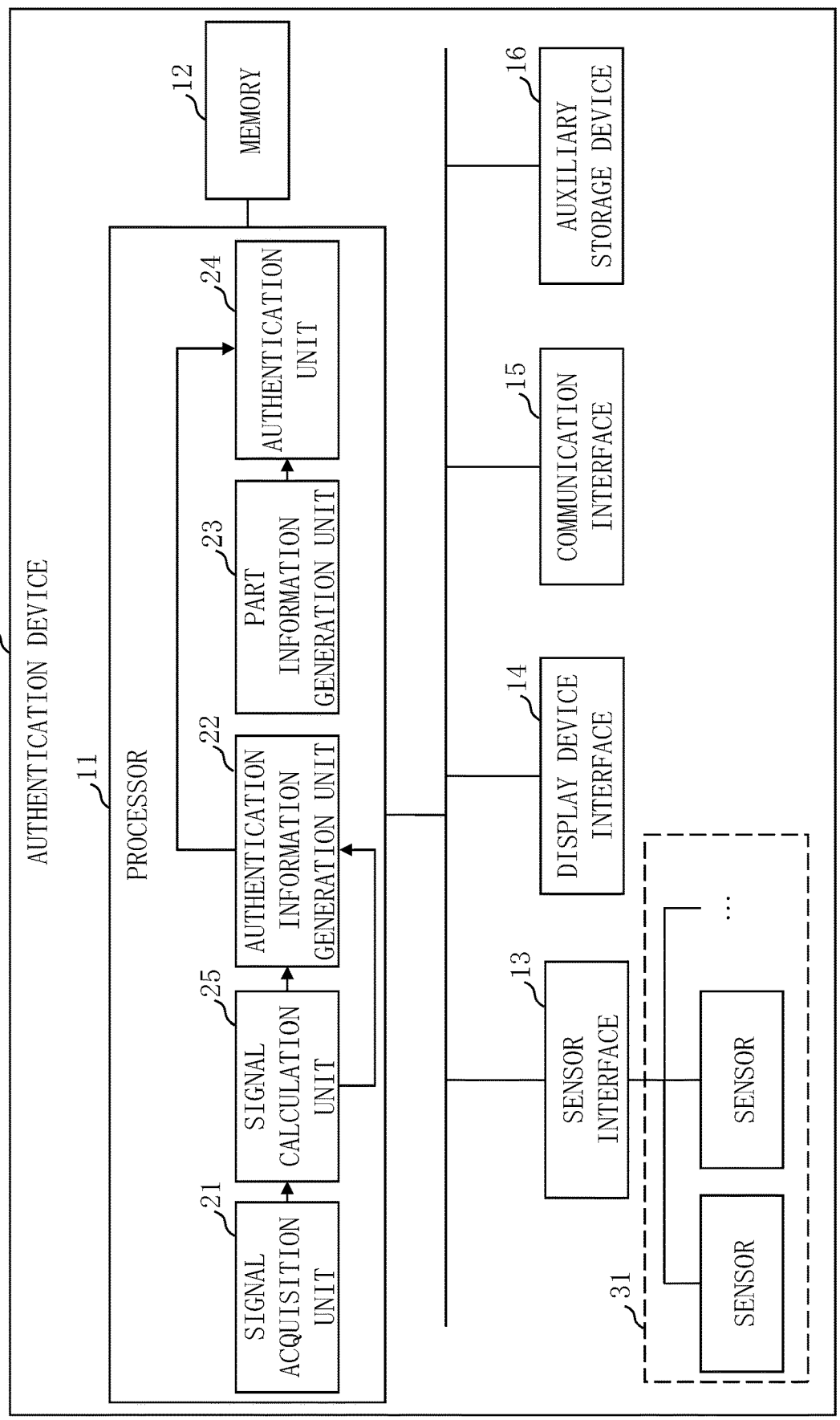
FIG. 7 is a structural diagram of the authentication device 10 according to Embodiment 2.

The structure of the authentication device 10 according to Embodiment 2 will be described with reference to FIG. 7.

The authentication device 10 differs from the authentication device 10 illustrated in FIG. 1 in that a signal calculation unit 25 is included as a functional component. The signal calculation unit 25 is achieved by software or hardware as other functional components.

In addition, the authentication device 10 differs from the authentication device 10 illustrated in FIG. 1 in that the processor 11 is connected to the plurality of sensors 31 via the sensor interface 13. The individual sensors 31 may have the same specification or different specifications.

Description of the Operation

The operation of the authentication device 10 according to Embodiment 2 will be described with reference to FIGS. 8 and 9.

The operation procedure of the authentication device 10 according to Embodiment 2 corresponds to the authentication method according to Embodiment 2. In addition, the programs that achieve the operation of the authentication device 10 according to Embodiment 2 correspond to the authentication programs according to Embodiment 2.

A flow of processing of the authentication device 10 according to Embodiment 2 will be described with reference to FIG. 8.

The processing of step S206 and step S207 is the same as the processing of step S104 and step S105 in FIG. 2.

Step S201: Calculation Method Determination Processing

The signal calculation unit 25 determines a calculation method for calculating the composite signal. A specific example of the calculation method is addition or subtraction of a plurality of biological signals. However, the calculation method is not limited to this.

Specifically, the signal calculation unit 25 determines the calculation method by using a method that receives the specification of the calculation method from the subject or the like or a method that reads a preset calculation method.

Step S202: Signal Acquisition Processing

The signal acquisition unit 21 acquires a plurality of biological signals of the subject from the plurality of sensors 31 connected via the sensor interface 13. The signal acquisition unit 21 writes the plurality of biological signals to the memory 12.

Step S203: Signal Calculation Processing

The signal calculation unit 25 receives the plurality of biological signals acquired in step S202 as an input, performs calculation by using the calculation method determined in step S201, and generates the composite signal. The signal calculation unit 25 writes the composite signal to the memory 12.

An example of the composite signal will be described with reference to FIG. 9.

Figure 9:
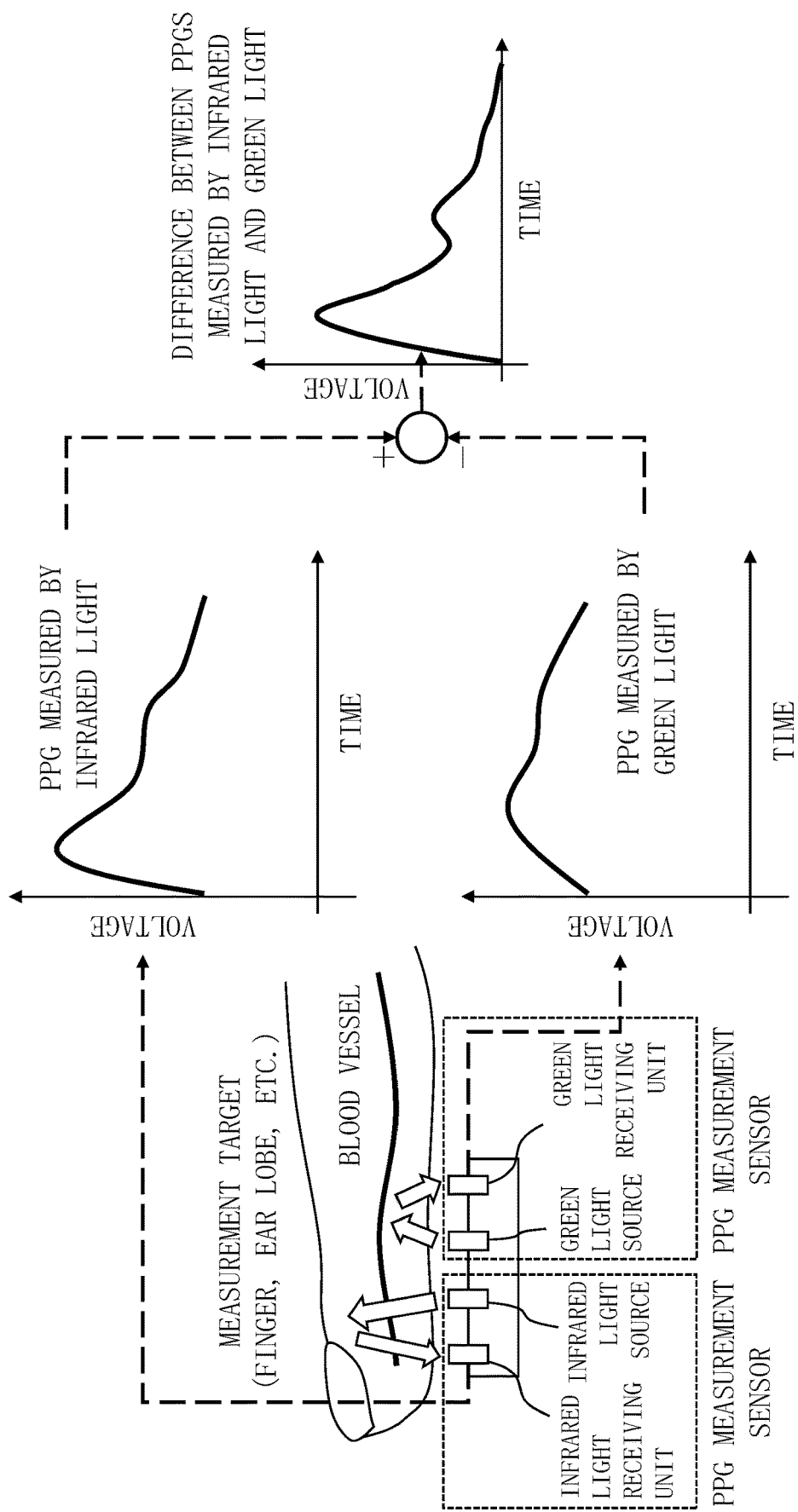
FIG. 9 is an explanatory diagram of a composite signal according to Embodiment 2.

FIG. 9 illustrates an example in which PPGs are measured by two sensors 31 and the calculation of the acquired PPGs is performed. The PPGs are measured by irradiating a blood vessel with light from a light source and acquiring the reflected or transmitted light by a light receiving unit. In a PPG, the measured waveform differs depending on the wavelength (color) of a light source. In particular, the depth that light can reach in the biological body differs depending on the wavelength. Accordingly, it is thought that, as illustrated in FIG. 9, for example, only the information of the deepest part can be extracted by calculating the difference between the biological signal acquired with green light and the biological signal acquired with infrared light. It is thought that the composite signal acquired by calculation between the biological signals as described above is more difficult to artificially generate than a single biological signal.

Step S204: Authentication Information Generation Processing

The authentication information generation unit 22 generates the authentication information based on the composite signal generated in step S203. The generation method of the authentication information is the same as that in the Embodiment 1 except that the composite signal is input instead of the biological signal. The authentication information generation unit 22 writes the authentication information to the memory 12.

Step S205: Part Information Generation Processing

The part information generation unit 23 generates the part information based on the composite signal generated in step S203. The generation method of the part information is the same as that in Embodiment 1 except that the composite signal is used as an input instead of the biological signal. The part information generation unit 23 writes the part information to the memory 12.

Figure 8:
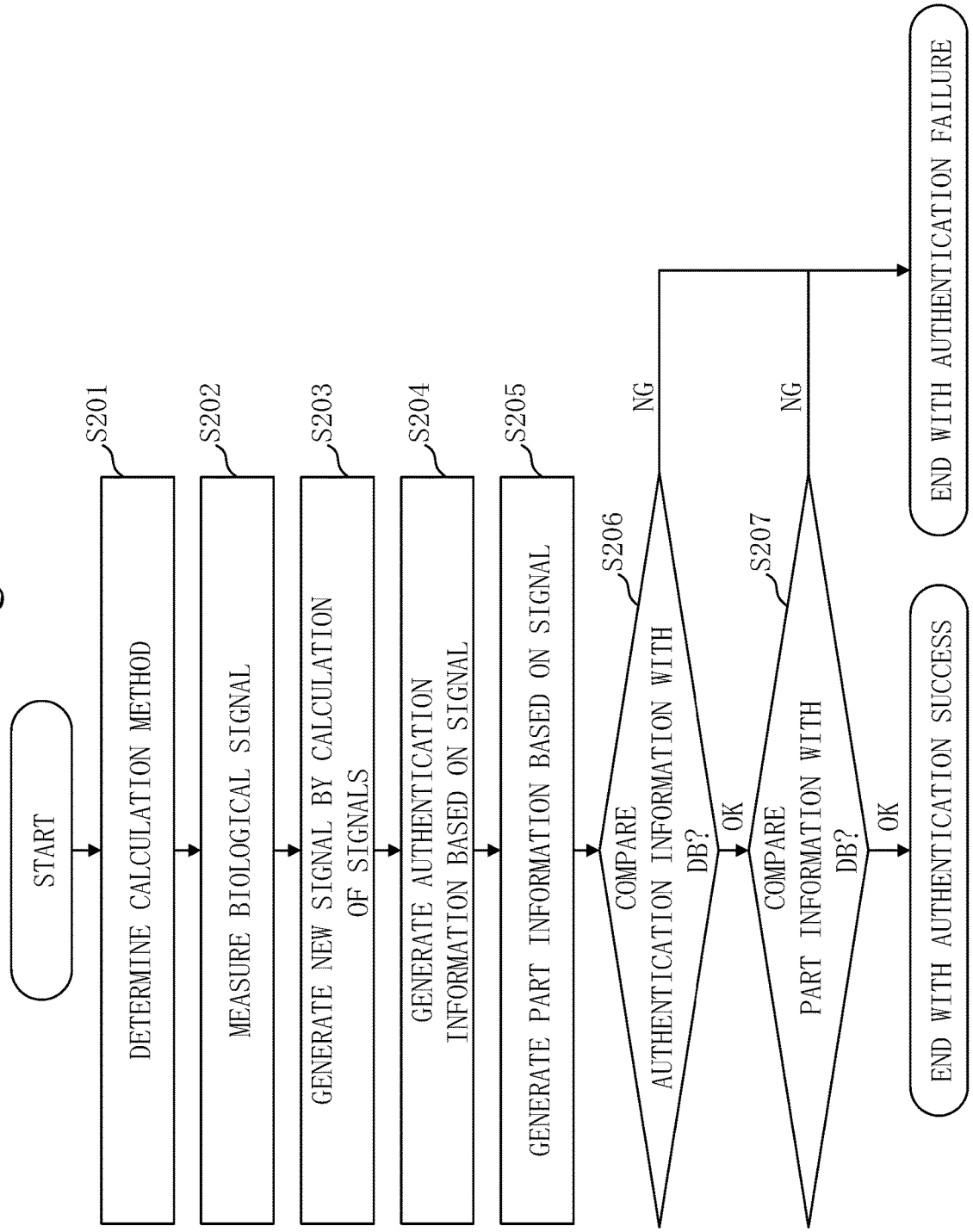
FIG. 8 is a flowchart of processing of the authentication device 10 according to Embodiment 2.

The authentication reference information and the part reference information need be stored before the processing illustrated in FIG. 8 is performed. Specifically, the processing from step S201 to step S205 is performed, the authentication information generated in step S204 is stored as the authentication reference information, and the part information generated in step S205 is stored as the part reference information. As in Embodiment 1, the authentication reference information and the part reference information may be acquired again after a certain period of time.

It should be noted that the order of execution of step S204 and step S205 and the order of execution of step S206 and step S207 are not limited to those illustrated in FIG. 8 and may be changed.

Effect of Embodiment 2

As described above, the authentication device 10 according to Embodiment 2 generates at least one of the authentication information and the part information based on the composite signal acquired by calculation of the plurality of biological signals. It is thought that the composite signal is more difficult to artificially generate than a single biological signal. Accordingly, better countermeasures against spoofing attacks that use fraudulent measurement of the biological signal can be achieved.

Other Structures

Modification 5

As in Modification 2, when the first authentication based on the authentication information and the second authentication based on the part information succeed continuously a plurality of times, an authentication success may be determined.

Figure 10:
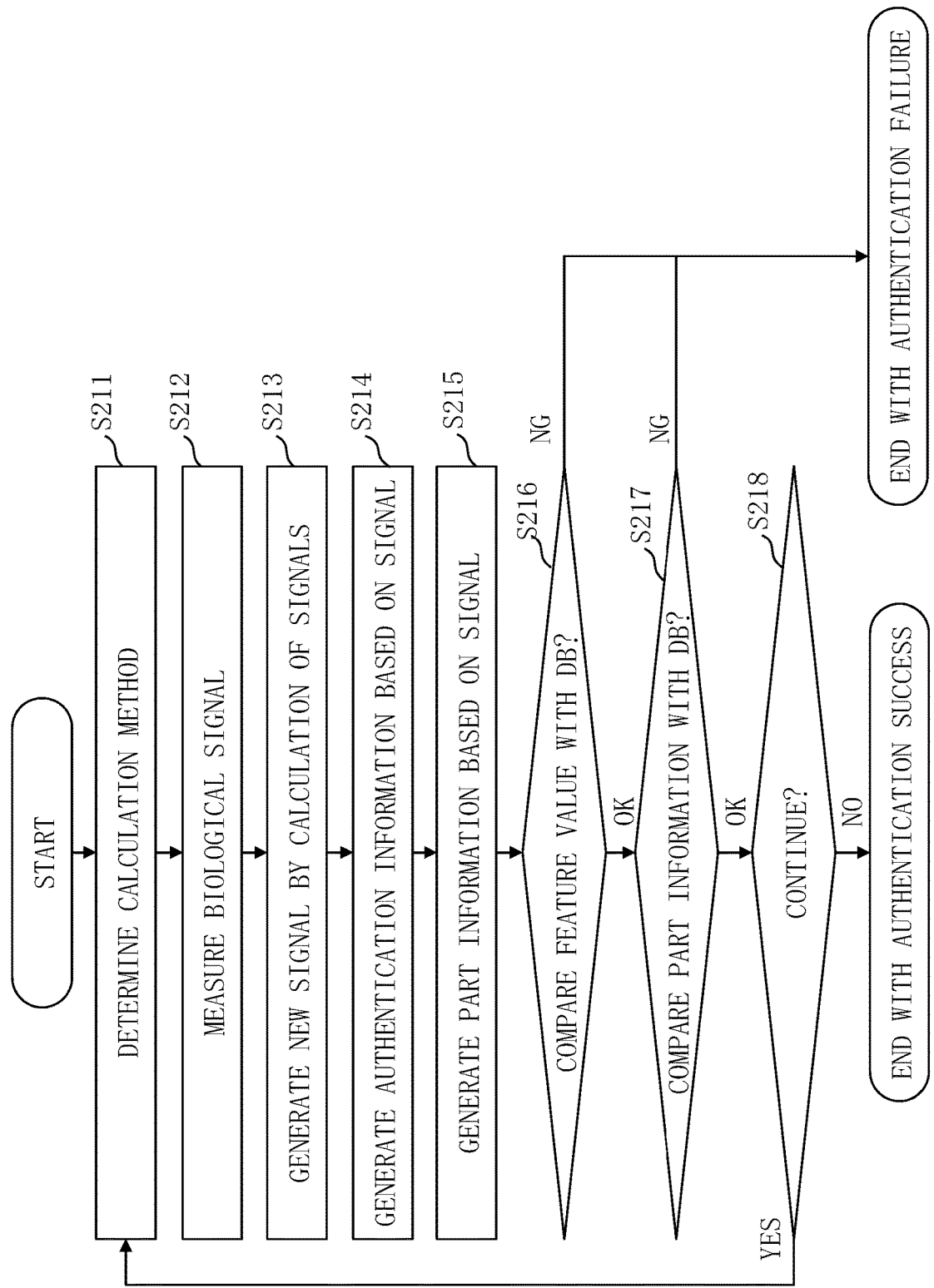
FIG. 10 is a flowchart of processing of the authentication device 10 according to Modification 5.

A flow of processing of the authentication device 10 according to Modification 5 will be described with reference to FIG. 10.

The processing from step S211 to step S217 is the same as the processing from step S201 to step S207 in FIG. 8. However, when determining that the second authentication has succeeded in step S217, the authentication unit 24 proceeds the processing to step S218.

Step S218: Continuation Determination Processing

The authentication unit 24 determines whether the number of successes of the first authentication and the second authentication has reached the reference count.

When the number of successes has reached the reference count, the authentication unit 24 ends the processing with an authentication success. In contrast, when the number of successes has not reached the reference count, the authentication unit 24 returns the processing to step S211.

It should be noted that, as in Modification 2, in step S217 in the second and subsequent rounds, the authentication unit 24 may determine whether the part information pertains to the same part as the part information generated in the first round. Then, the authentication unit 24 may determine that the second authentication has succeeded when the condition is met and the part information pertains to the same part as the part information generated in the first round.

In addition, in step S211, the calculation method may be changed each time such that the attacker cannot observe the calculation method and the composite signal can be generated by using a different calculation method each time. This can make the difficulty of spoofing attacks even higher.

Embodiment 3

Embodiment 3 differs from Embodiment 1 in that the biological signal corresponding to the sensor control information is acquired by giving the sensor control information to the sensor 31 and then acquiring the biological signal. In Embodiment 3, this difference will be described and identical points are not described.

Description of the Structure

Figure 11:
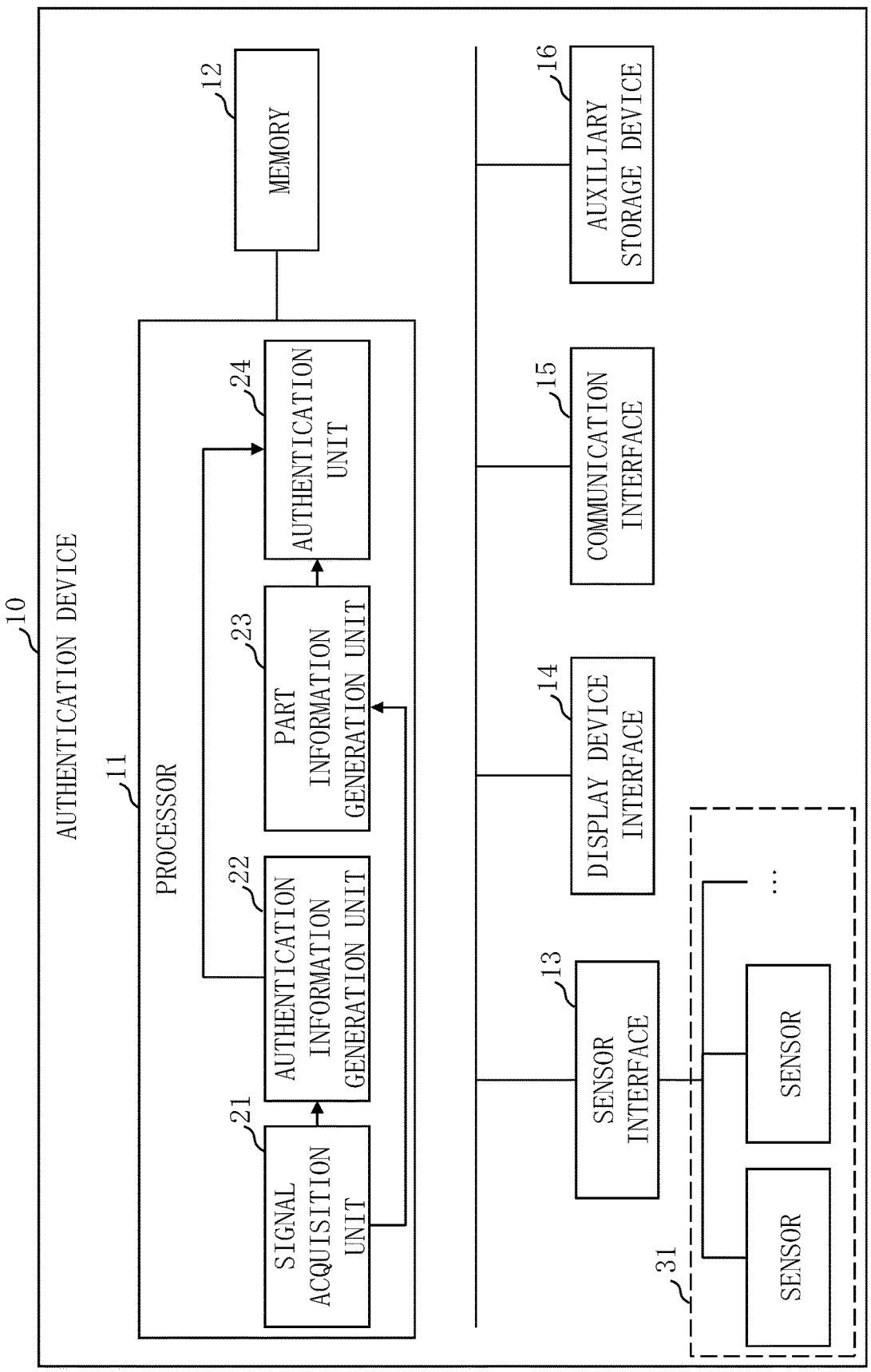
FIG. 11 is a structural diagram of the authentication device 10 according to Embodiment 3.

The structure of the authentication device 10 according to Embodiment 3 will be described with reference to FIG. 11.

The authentication device 10 differs from the authentication device 10 illustrated in FIG. 1 in that the processor 11 is connected to the plurality of sensors 31 via the sensor interface 13. The individual sensors 31 are controlled by the sensor control information given by the processor 11.

It should be noted that the case in which the plurality of sensors 31 are used is described herein, but the authentication device 10 may use a single sensor 31 and acquire a different biological signal depending on the sensor control information.

Description of the Operation

The operation of the authentication device 10 according to Embodiment 3 will be described with reference to from FIGS. 12 to 14.

The operation procedure of the authentication device 10 according to Embodiment 3 corresponds to the authentication method according to Embodiment 3. In addition, the programs that achieve the operation of the authentication device 10 according to Embodiment 3 correspond to the authentication programs according to Embodiment 3.

A flow of processing of the authentication device 10 according to Embodiment 3 will be described with reference to FIG. 12.

The processing of step S303 and step S304 is the same as the processing of step S102 and step S103 in FIG. 2.

Step S301: Control Information Determination Processing

The signal acquisition unit 21 determines the sensor control information. Specific examples of the sensor control information are information indicating the sensor 31 to be used among the plurality of sensors 31 and information for setting the wavelength (color) of the light source included in the optical sensor. However, the sensor control information is not limited to these pieces of information.

Specifically, the signal acquisition unit 21 determines the sensor control information by using a method that receives the specification of the sensor control information from the subject or the like or a method that reads preset sensor control information. In the preset method, the sensor control information to be used may be determined according to the time of day. For example, a green light source may be used before time t1 and an infrared light source may be used after time t1. Alternatively, the order in which a plurality of pieces of control information is used may be determined randomly in advance. For example, a green light source and a red light source may be used alternately.

Step S302: Signal Acquisition Processing

The signal acquisition unit 21 acquires, from the sensor 31 connected via the sensor interface 13, the biological signal corresponding to the sensor control information determined in step S301.

Specifically, the signal acquisition unit 21 controls the sensor 31 based on the sensor control information determined in step S301 and then acquires the biological signal from the sensor 31. The signal acquisition unit 21 writes the biological signal to the memory 12.

Step S305: First Authentication Processing

The authentication unit 24 performs the first authentication by using the reference corresponding to the sensor control information determined in step S301.

Specifically, the authentication unit 24 determines whether the first authentication has succeeded or failed by comparing the authentication information generated in step S303 with the authentication reference information, stored in the auxiliary storage device 16 in advance, that corresponds to the sensor control information. At this time, the authentication unit 24 determines whether the first authentication has succeeded or failed by determining whether the condition corresponding to the sensor control information is met.

When determining that the first authentication has succeeded, the authentication unit 24 proceeds the processing to step S306. In contrast, when determining that the first authentication has failed, the authentication unit 24 ends the processing with an authentication failure. It should be noted that, when determining that the first authentication has failed, the authentication unit 24 may return the processing to step S301 to perform the authentication processing again.

Step S306: Second Authentication Processing

The authentication unit 24 performs the second authentication by using the reference corresponding to the sensor control information determined in step S301.

Specifically, the authentication unit 24 determines whether the second authentication has succeeded or failed by comparing the part information generated in step S304 with the part reference information, stored in the auxiliary storage device 16 in advance, that corresponds to the sensor control information. At this time, the authentication unit 24 determines whether the second authentication has succeeded or failed by determining whether the condition corresponding to the sensor control information is met.

When determining that the second authentication has succeeded, the authentication unit 24 ends the processing with an authentication success. In contrast, when determining that the second authentication has failed, the authentication unit 24 ends the processing with an authentication failure. It should be noted that, when determining that the second authentication has failed, the authentication unit 24 may return the processing to step S301 to perform the authentication processing again.

Figure 12:
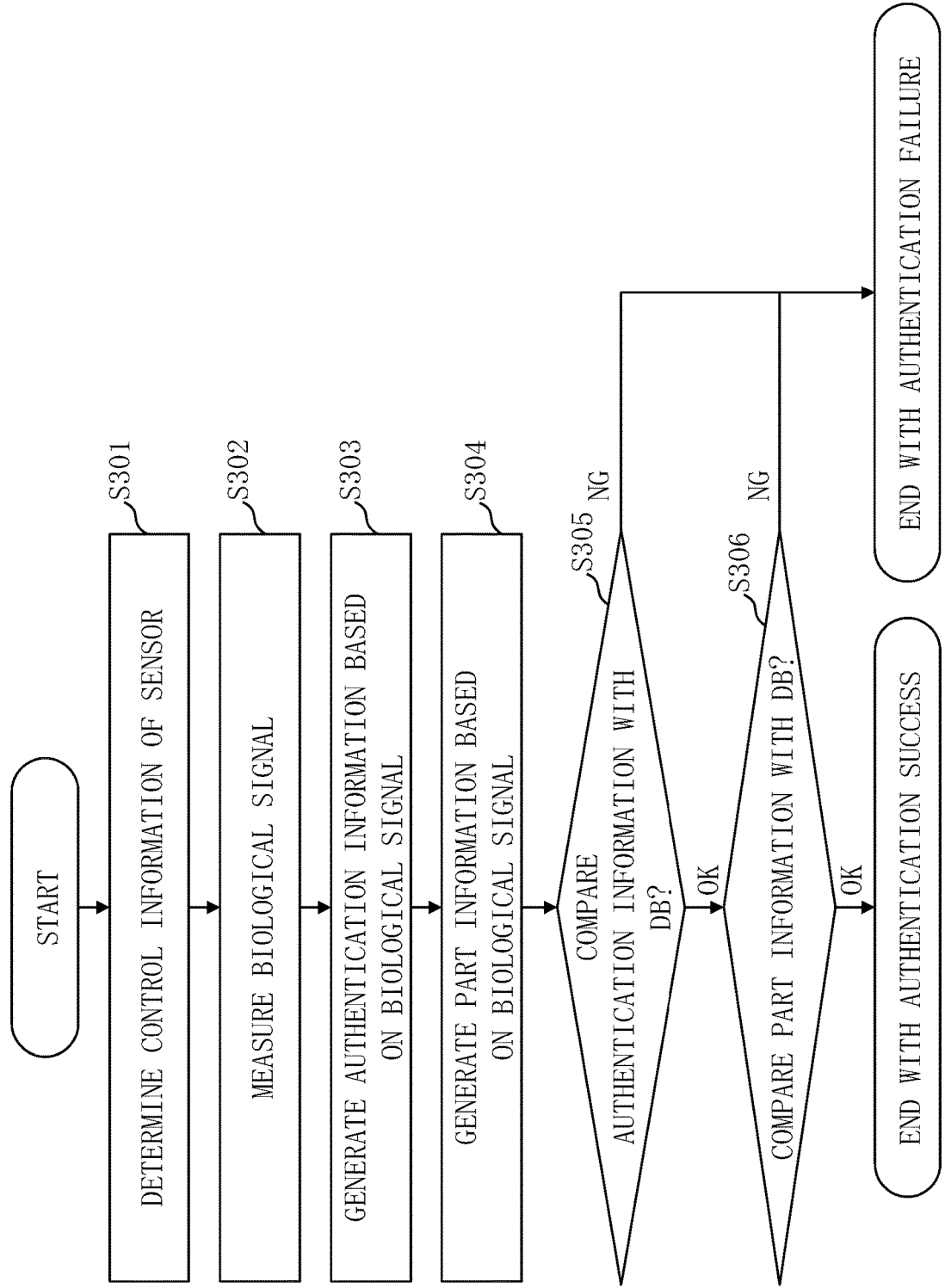
FIG. 12 is a flowchart of processing of the authentication device 10 according to Embodiment 3.

The authentication reference information and the part reference information that correspond to the sensor control information need be stored before the processing illustrated in FIG. 12 is performed. Specifically, the processing from step S301 to step S304 is performed, the authentication information generated in step S303 is stored as the authentication reference information, and the part information generated in step S304 is stored as the part reference information. At this time, the processing from step S301 to step S304 is performed for the plurality of pieces of sensor control information used, and the plurality of pieces of authentication reference information and part reference information that correspond to plurality of pieces of sensor control information are stored.

As a result, as illustrated in FIGS. 13 and 14, for one subject, the authentication reference information and the part reference information are stored together with the measurement date and time of the biological signal for each piece of sensor control information. FIG. 13 illustrates an example of changing the sensor 31 to be used according to the sensor control information. FIG. 14 illustrates an example of changing the light source according to the sensor control information. It should be noted that FIGS. 13 and 14 illustrate the cases in which feature values are used as the authentication reference information and the part reference information. In FIG. 13, for individual subjects, the authentication reference information and the part reference information when the sensor 1 is used and when the sensor 2 is used are stored. In FIG. 14, for individual subjects, the authentication reference information and the part reference information when the light source is green light and when the light source is red light are stored.

It should be noted that the order of execution of step S303 and step S304 and the order of execution of step S305 and step S306 are not limited to those illustrated in FIG. 12 and may be changed.

Effect of Embodiment 3

As described above, the authentication device 10 according to Embodiment 3 acquires the biological signal corresponding to the sensor control information. For example, a PPG is measured by using, for example, a green light source or an infrared light source with a photodetector, but the measured waveform differs depending on the wavelength of the light source. Accordingly, the authentication information and the part information to be acquired differs by changing the wavelength of the light source. The attacker cannot observe the sensor control information. For example, the attacker cannot observe the type of a light source used or the sensor 31 used as the control information. Accordingly, spoofing attacks that measure or generate the biological signal used for authentication are impossible or more difficult than in Embodiment 1.

Other Structures

Modification 6

As in Modification 2, when the first authentication based on the authentication information and the second authentication based on the part information succeed continuously a plurality of times, an authentication success may be determined.

Figure 15:
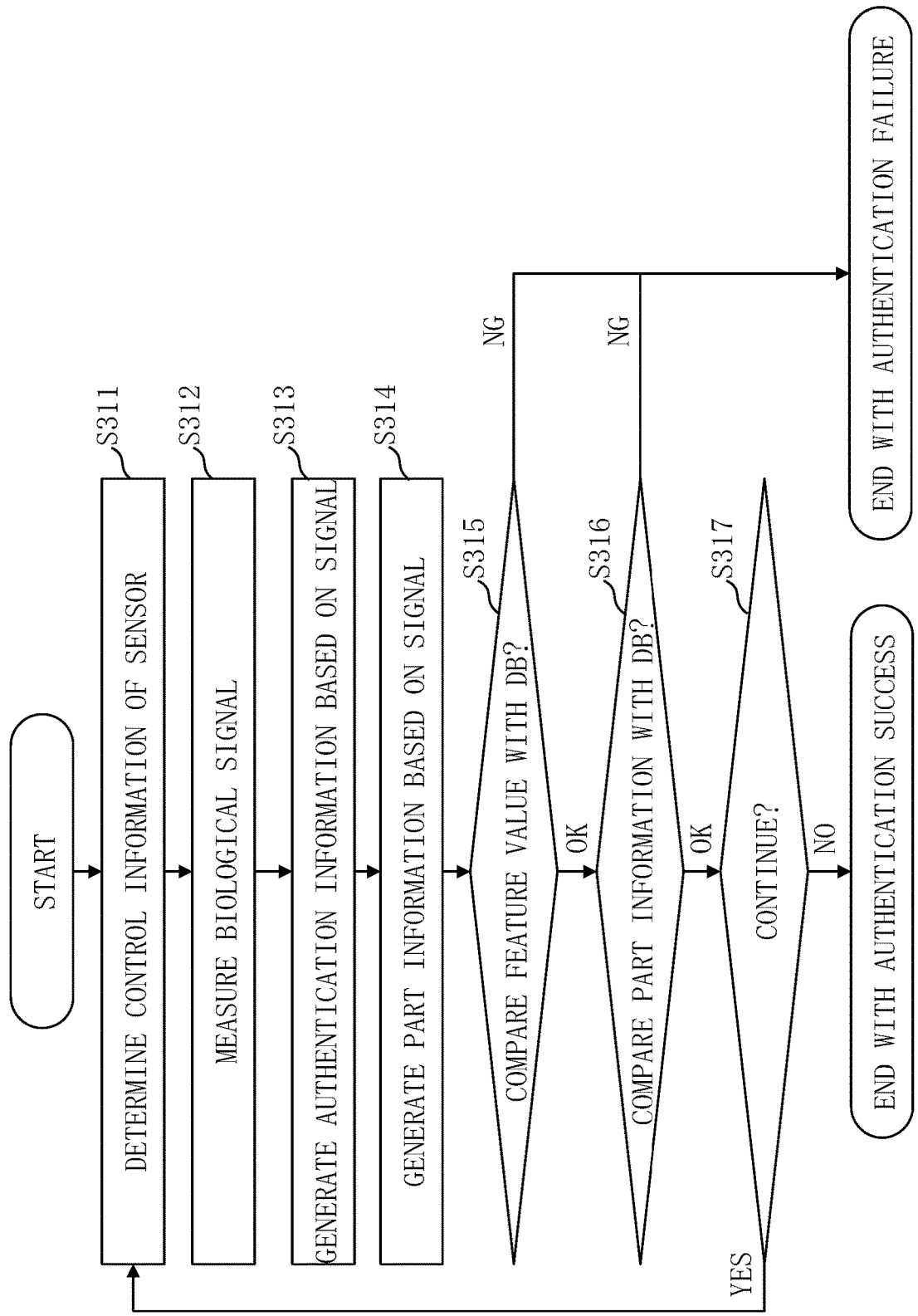
FIG. 15 is a flowchart of processing of the authentication device 10 according to Modification 6.

A flow of processing of the authentication device 10 according to Modification 6 will be described with reference to FIG. 15.

The processing from step S311 to step S316 is the same as the processing from step S301 to step S306 in FIG. 12. However, when determining that the second authentication has succeeded in step S316, the authentication unit 24 proceeds the processing to step S317.

Step S317: Continuation Determination Processing

The authentication unit 24 determines whether the number of successes of the first authentication and the second authentication has reached the reference count.

When the number of successes has reached the reference count, the authentication unit 24 ends the processing with an authentication success. In contrast, when the number of successes has not reached the reference count, the authentication unit 24 returns the processing to step S311.

It should be noted that, as in Modification 2, in step S316 in the second and subsequent rounds, the authentication unit 24 may determine whether the part information pertains to the same part as the part information generated in the first round. Then, the authentication unit 24 may determine that the second authentication has succeeded when the condition is met and the part information pertains to the same part as the part information generated in the first round.

In addition, in step S311, the sensor control information may be changed every time. This can make the difficulty of spoofing attacks even higher.

Embodiment 4

Embodiment 4 differs from Embodiment 1 in that authentication is performed by using physiological indexes such as a heart rate and a respiratory rate identified by a plurality of methods such as an optical method and an electrical method. In Embodiment 4, this difference will be described and identical points are not described.

Description of the Structure

Figure 16:
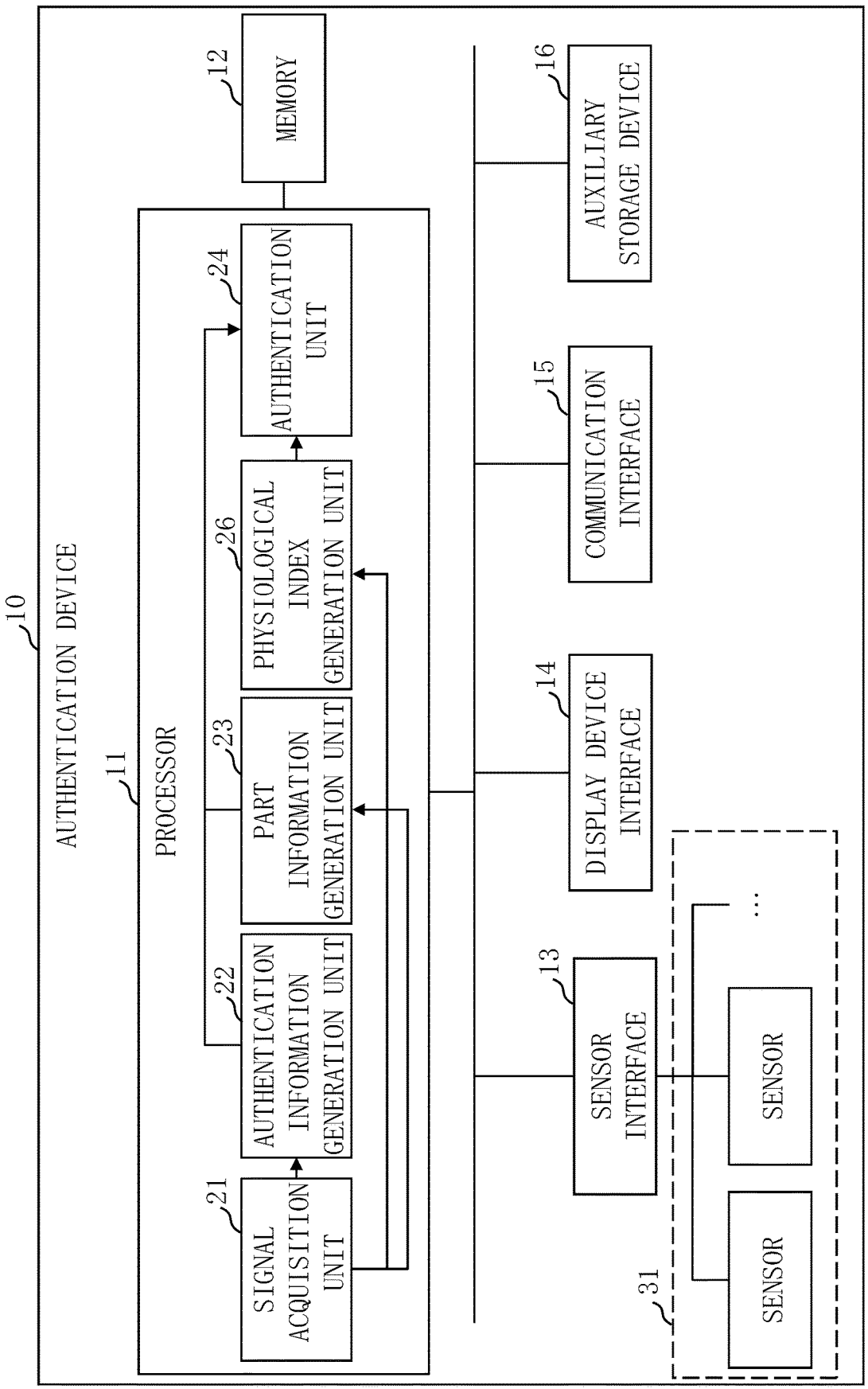
FIG. 16 is a structural diagram of the authentication device 10 according to Embodiment 4.

The structure of the authentication device 10 according to Embodiment 4 will be described with reference to FIG. 16.

The authentication device 10 differs from the authentication device 10 illustrated in FIG. 1 in that a physiological index generation unit 26 is provided as a functional component. The physiological index generation unit 26 is achieved by software or hardware as other functional components.

In addition, the authentication device 10 differs from the authentication device 10 illustrated in FIG. 1 in that the processor 11 is connected to the plurality of sensors 31 via the sensor interface 13. The plurality of sensors 31 are sensors that measure different physical amounts, such as an optical sensor and a vibration sensor.

Description of the Operation

The operation of the authentication device 10 according to Embodiment 4 will be described with reference to FIGS. 17 to 19.

The operation procedure of the authentication device 10 according to Embodiment 4 corresponds to the authentication method according to Embodiment 4. In addition, the programs that achieve the operation of the authentication device 10 according to Embodiment 4 correspond to the authentication programs according to Embodiment 4.

A flow of processing of the authentication device 10 according to Embodiment 4 will be described with reference to FIG. 17.

The processing of step S402 and step S403 is the same as the processing of step S102 and step S103 in FIG. 2. The processing of step S405 and step S406 is the same as the processing of step S104 and step S105 in FIG. 2. However, when determining that the second authentication has succeeded in step S406, the authentication unit 24 proceeds the processing to step S407 without determining an authentication success.

(Step S401: Signal Acquisition Processing)

The signal acquisition unit 21 acquires the plurality of biological signals of the subject from the plurality of sensors 31 connected via the sensor interface 13. The signal acquisition unit 21 writes the plurality of biological signals to the memory 12.

The plurality of biological signals are acquired here, but, in step S402, the authentication information may be generated based on any one of the biological signals or the authentication information may be generated based on the plurality the biological signals. Similarly, in step S403, the part information may be generated based on any one of the biological signals, or the part information may be generated based on the plurality of biological signals. It should be noted that the authentication information and the part information may be generated using other biological signals.

Step S404: Physiological Index Generation Processing

The physiological index generation unit 26 generates the physiological indexes regarding the same physiology based on the plurality of biological signals acquired in step S401. The physiological index generation unit 26 writes the physiological indexes generated based on the biological signals to the memory 12.

Examples of the physiological indexes will be described with reference to FIG. 18.

Figure 18:
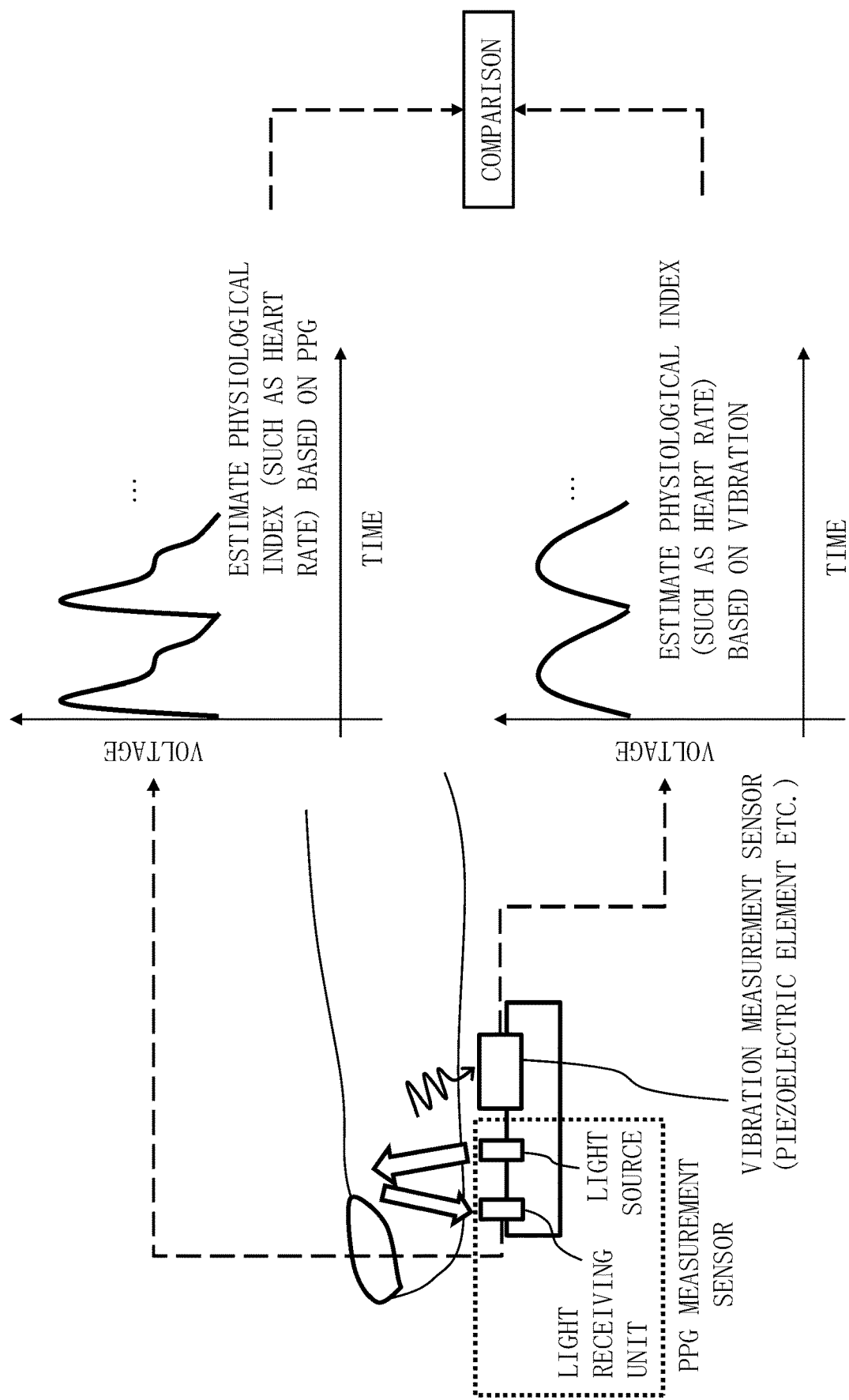
FIG. 18 is an explanatory diagram of physiological indexes according to Embodiment 4.

In FIG. 18, the PPG of the subject is measured by a PPG measurement sensor, and the minute vibration of the subject is measured by a vibration measurement sensor such as a piezoelectric element. It is known that the physiological indexes such as the heart rate and the respiration rate can be acquired based on the PPG. It is known that the physiological indexes such as the heart rate and the respiration rate can also be acquired based on the minute vibration acquired by the vibration measurement sensor. Therefore, the physiological index generation unit 26 may generate the heart rate as a physiological index from, for example, the PPG and the minute vibration.

Step S407: Third Authentication Processing

The authentication unit 24 determines whether the third authentication has succeeded or failed by comparing the physiological indexes generated based on the plurality of the biological signals.

Specifically, the authentication unit 24 determines whether the condition that the similarity between the physiological indexes generated based on the plurality of biological signals is equal to or more than a third threshold or the difference between the physiological indexes generated based on the plurality of biological signals falls within an allowable value is met. The authentication unit 24 determines that the third authentication has succeeded when the condition is met or determines that the third authentication has failed when the condition is not met.

When determining that the third authentication has succeeded, the authentication unit 24 ends the processing with an authentication success. In contrast, when determining that the third authentication has failed, the authentication unit 24 ends the processing with an authentication failure. It should be noted that, when determining that the third authentication has failed, the authentication unit 24 may return the processing to step S401 to perform the authentication processing again.

It should be noted that the condition for determining whether the third authentication has succeeded or failed may include whether the difference between the physiological indexes generated based on the plurality of biological signals and the reference values of the physiological indexes falls within an allowable value. In this case, as illustrated in FIG. 19, the reference values of the physiological indexes as well as the authentication reference information and the part reference information need be stored before the processing illustrated in FIG. 17 is performed. Specifically, the processing from step S401 to step S404 is performed, and the average value or the like of the physiological indexes generated in step S404 is stored as the reference values of the physiological indexes.

Figure 17:
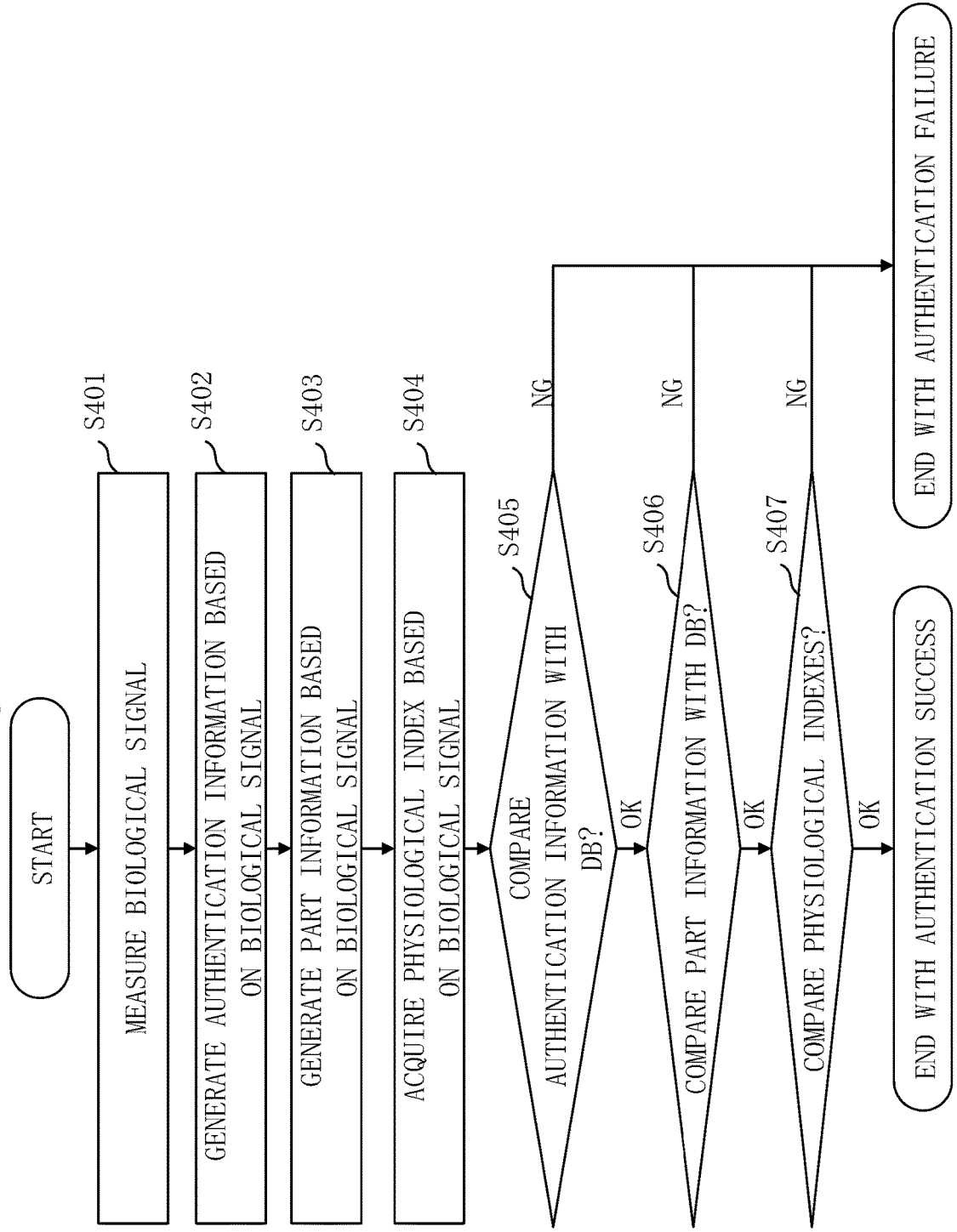
FIG. 17 is a flowchart of processing of the authentication device 10 according to Embodiment 4.

It should be noted that the order of execution of step S402 to step S404 and the order of execution of step S405 to step S407 are not limited to those illustrated in FIG. 17 and may be changed.

Effects of Embodiment 4

As described above, the authentication device 10 according to Embodiment 4 performs authentication by using the physiological indexes in addition to the authentication information and the part information. This can guarantee that the measurement target is a biological body to some extent. In addition, since the plurality of sensors 31 measure different physical amounts, the labor and difficulty of artificial signal generation become high, thereby making the difficulty of spoofing attacks higher.

Other Structures

Modification 7

As in Modification 2, when the first authentication based on the authentication information, the second authentication based on the part information, and the third authentication based on the physiological indexes succeed continuously a plurality of times, an authentication success may be determined.

A flow of processing of the authentication device 10 according to Modification 7 will be described with reference to FIG. 20.

The processing from step S411 to step S417 is the same as the processing from step S401 to step S407 in FIG. 17. However, when determining that the third authentication has succeeded in step S417, the authentication unit 24 proceeds the processing to step S418.

Step S418: Continuation Determination Processing

The authentication unit 24 determines whether the number of successes of the first authentication, the second authentication, and the third authentication has reached the reference count.

When the number of successes has reached the reference count, the authentication unit 24 ends the processing with an authentication success. In contrast, when the number of successes has not reached the reference count, the authentication unit 24 returns the processing to step S411.

It should be noted that, as in Modification 2, in step S416 in the second and subsequent rounds, the authentication unit 24 may determine whether the part information pertains to the same part as the part information generated in the first round. Then, the authentication unit 24 may determine that the second authentication has succeeded when the conditions are met and the part information pertains to the same part as the part information generated in the first round.

It should be noted that "unit" in the above description may be read as "circuit", "process", "procedure", "processing", or "processing circuit".

The embodiments and the modifications of the present disclosure have been described above. Some of the embodiments and the modifications may be practiced in combination. Alternatively, any one of them or some of them may be practiced partially. It should be noted that the present disclosure is not limited to the embodiments and the modifications described above and may be changed variously as necessary.

REFERENCE SIGNS LIST

10: authentication device; 11: processor; 12: memory; 13: sensor interface; 14: display device interface; 15: communication interface; 16: auxiliary storage device; 21: signal acquisition unit; 22: authentication information generation unit; 23: part information generation unit; 24: authentication unit; 25: signal calculation unit; 26: physiological index generation unit; 31: sensor

The invention claimed is:

1. An authentication device comprising processing circuitry to:
acquire via measurement by at least one sensor a plurality of biological signals, which originate from one or more physiological processes in a human body, a plurality of times at different times of day;
generate a composite signal by calculation of the plurality of biological signals acquired the plurality of times, the calculation being performed by a calculation method that differs for each of the plurality of times;
generate, based on the generated composite signal, authentication information that differs depending on an individual human whose physiology is the source of the biological signals;
generate, based on at least any of the acquired biological signals, part information that differs depending on a part from which the biological signals are acquired; and
perform authentication based on the generated authentication information and the generated part information,
wherein the at least any of the acquired biological signals, from which the part information is generated, is acquired via measurement of the same part of the individual human's body as at least one of the plurality of biological signals from which the authentication information is generated.

2. An authentication device comprising
processing circuitry to:
acquire via measurement by at least one sensor a plurality of biological signals, which originate from one or more physiological processes in a human body, a plurality of times at different times of day;
generate a composite signal by calculation of the plurality of biological signals acquired the plurality of times, the calculation being performed by a calculation method that differs for each of the plurality of times;
generate, based on at least any of the acquired biological signals, authentication information that differs depending on an individual human whose physiology is the source of the biological signals;
generate, based on the generated composite signal, part information that differs depending on a part from which the biological signals are acquired; and
perform authentication based on the generated authentication information and the generated part information,
wherein the at least any of the acquired biological signals, from which the authentication information is generated, is acquired via measurement of the same part of the individual human's body as at least one of the plurality of biological signals from which the part information is generated.

3. An authentication device comprising
processing circuitry to:
acquire via measurement by at least one sensor at least one biological signal corresponding to sensor control information a plurality of times at different times of day, said sensor control information varying with time, said at least one biological signal originating from at least one physiological process in a human body;
set the at least one biological signal acquired the plurality of times to a target biological signal;
generate, based on the target biological signal, authentication information that differs depending on an individual human whose physiology is the source of the at least one biological signal;

generate, based on the target biological signal, part information that differs depending on a part from which a biological signal among the at least one biological signal is acquired; and perform authentication based on the authentication information generated for the target biological signal and the part information generated for the target biological signal by using a reference corresponding to the sensor control information corresponding to the target biological signal, wherein the part information and the authentication information are generated from biological signals acquired via measurement from the same part of the individual human's body.

4. The authentication device according to claim 3, wherein the processing circuitry determines whether authentication succeeds depending on whether the authentication information meets the reference and the part information meets the reference.

5. The authentication device according to claim 4, wherein the processing circuitry generates the part information for the biological signal acquired the plurality of times, and determines whether authentication succeeds depending on whether the part corresponding to each piece of the part information for the biological signal acquired the plurality of times is the same.

6. The authentication device according to claim 1, wherein the processing circuitry generates physiological indexes regarding a single physiology based on two or more of the acquired biological signals, and performs authentication by comparing, with each other, the generated physiological indexes based on the two or more biological signals.

7. An authentication method comprising:

acquiring via measurement by at least one sensor a plurality of biological signals, which originate from one or more physiological processes in a human body, a plurality of times at different times of day;

generating a composite signal by calculation of the plurality of biological signals acquired the plurality of times, the calculation being performed by a calculation method that differs for each of the plurality of times;

generating, based on the composite signal, authentication information that differs depending on an individual human whose physiology is the source of the biological signals;

generating, based on at least any of the biological signals, part information that differs depending on a part from which the biological signals are acquired; and performing authentication based on the authentication information and the part information, wherein the at least any of the acquired biological signals, from which the part information is generated, is acquired via measurement of the same part of the individual human's body as at least one of the plurality of biological signals from which the authentication information is generated.

8. An authentication method comprising:

acquiring via measurement by at least one sensor a plurality of biological signals, which originate from one or more physiological processes in a human body, a plurality of times at different times of day;

generating a composite signal by calculation of the plurality of biological signals acquired the plurality of times, the calculation being performed by a calculation method that differs for each of the plurality of times;

generating, based on at least any of the biological signals, authentication information that differs depending on an individual human whose physiology is the source of the biological signals;

generating, based on the composite signal, part information that differs depending on a part from which the biological signals are acquired; and performing authentication based on the authentication information and the part information, wherein the at least any of the acquired biological signals, from which the authentication information is generated, is acquired via measurement of the same part of the individual human's body as at least one of the plurality of biological signals from which the part information is generated.

9. An authentication method comprising:

acquiring via measurement by at least one sensor at least one biological signal corresponding to sensor control information a plurality of times at different times of day, said sensor control information varying with time, said at least one biological signal originating from at least one physiological process in a human body;

setting the at least one biological signal acquired the plurality of times to a target biological signal;

generating, based on the target biological signal, authentication information that differs depending on an individual human whose physiology is the source of the at least one biological signal;

generating, based on the target biological signal, part information that differs depending on a part from which a biological signal among the at least one biological signal is acquired; and performing authentication based on the authentication information generated for the target biological signal and the part information generated for the target biological signal by using a reference corresponding to the sensor control information corresponding to the target biological signal, wherein the part information and the authentication information are generated from biological signals acquired via measurement from the same part of the individual human's body.

10. A non-transitory computer readable medium storing an authentication program that causes a computer to function as an authentication device to execute:

a signal acquisition process of acquiring via measurement by at least one sensor a plurality of biological signals, which originate from at least one physiological process in a human body, a plurality of times at different times of day;

a signal calculation process of generating a composite signal by calculation of the plurality of biological signals acquired the plurality of times in the signal acquisition process, the calculation being performed by a calculation method that differs for each of the plurality of times;

an authentication information generation process of generating, based on the composite signal generated in the signal calculation process, authentication information that differs depending on an individual human whose physiology is the source of the biological signals;

a part information generation process of generating, based on at least any of the biological signals acquired in the signal acquisition process, part information that differs depending on a part from which the biological signals are acquired; and an authentication process of performing authentication based on the authentication information generated in the authentication information generation process and the part information generated in the part information generation process, wherein the at least any of the acquired biological signals, from which the part information is generated, is acquired via measurement of the same part of the individual human's body as at least one of the plurality of biological signals from which the authentication information is generated.

11. A non-transitory computer readable medium storing an authentication program that causes a computer to function as an authentication device to execute:

a signal acquisition process of acquiring via measurement by at least one sensor a plurality of biological signals, which originate from at least one physiological process in a human body, a plurality of times at different times of day;

a signal calculation process of generating a composite signal by calculation of the plurality of biological signals acquired the plurality of times in the signal acquisition process, the calculation being performed by a calculation method that differs for each of the plurality of times;

an authentication information generation process of generating, based on at least any of the biological signals acquired in the signal acquisition process, authentication information that differs depending on an individual human whose physiology is the source of the biological signals;

a part information generation process of generating, based on the composite signal generated in the signal calculation process, part information that differs depending on a part from which a biological signal among the at least one biological signal is acquired; and an authentication process of performing authentication based on the authentication information generated in the authentication information generation process and the part information generated in the part information generation process, wherein the at least any of the acquired biological signals, from which the authentication information is generated, is acquired via measurement of the same part of the individual human's body as at least one of the plurality of biological signals from which the part information is generated.

12. A non-transitory computer readable medium storing an authentication program that causes a computer to function as an authentication device to execute a process of:

acquiring, via measurement by at least one sensor, at least one biological signal corresponding to sensor control information a plurality of times at different times of day, said sensor control information varying with time, said at least one biological signal being generated by a human body and measured by at least one sensor;

setting the at least one biological signal acquired the plurality of times in the signal acquisition process to a target biological signal generating, based on the target biological signal, authentication information that differs depending on an individual human whose physiology is the source of the at least one biological signal;

generating, based on the target biological signal, part information that differs depending on a part from which the biological signals are acquired; and performing authentication based on the authentication information generated for the target biological signal in the authentication information generation process and the part information generated for the target biological signal in the part information generation process by using a reference corresponding to the sensor control information corresponding to the target biological signal, wherein the part information and the authentication information are generated from biological signals acquired via measurement from the same part of the individual human's body.

13. The authentication device according to claim 1, wherein at least one of the biological signals is acquired as measured electrical activity in the human body.

14. The authentication device according to claim 2, wherein at least one of the biological signals is acquired as measured electrical activity in the human body.

15. The authentication device according to claim 3, wherein a biological signal among the at least one biological signal is acquired as measured electrical activity in the human body.

16. The authentication method according to claim 7, wherein at least one of the biological signals is acquired as measured electrical activity in the human body.

17. The authentication method according to claim 8, wherein at least one of the biological signals is acquired as measured electrical activity in the human body.

18. The authentication method according to claim 9, wherein a biological signal among the at least one biological signal is acquired as measured electrical activity in the human body.

19. The non-transitory computer readable medium according to claim 10, wherein at least one of the biological signals is acquired as measured electrical activity in the human body.

20. The non-transitory computer readable medium according to claim 11, wherein at least one of the biological signals is acquired as measured electrical activity in the human body.

21. The non-transitory computer readable medium according to claim 12, wherein at least one of the biological signals is acquired as measured electrical activity in the human body.

* * * * *